(12) United States Patent
Imagawa et al.

(10) Patent No.: US 12,209,934 B2
(45) Date of Patent: Jan. 28, 2025

(54) IMAGING PARAMETER OUTPUT METHOD AND IMAGING PARAMETER OUTPUT DEVICE

(71) Applicant: Panasonic Intellectual Property Management Co., Ltd., Osaka (JP)

(72) Inventors: Taro Imagawa, Osaka (JP); Akihiro Noda, Osaka (JP); Yuki Maruyama, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 481 days.

(21) Appl. No.: 17/568,129

(22) Filed: Jan. 4, 2022

(65) Prior Publication Data
US 2022/0128433 A1 Apr. 28, 2022

Related U.S. Application Data

(63) Continuation of application No. PCT/JP2020/025158, filed on Jun. 26, 2020.

(30) Foreign Application Priority Data

Aug. 28, 2019 (JP) ................. 2019-156048

(51) Int. Cl.
*G01M 5/00* (2006.01)
*G01B 11/00* (2006.01)
(Continued)

(52) U.S. Cl.
CPC .......... *G01M 5/0008* (2013.01); *G01B 11/00* (2013.01); *G03B 35/08* (2013.01); *G06V 20/176* (2022.01); *G06V 20/182* (2022.01); *G06V 20/188* (2022.01)

(58) Field of Classification Search
None
See application file for complete search history.

(56) References Cited

U.S. PATENT DOCUMENTS

2017/0243366 A1  8/2017  Imagawa
2019/0026921 A1* 1/2019  Murayama ............... G06T 7/74
(Continued)

FOREIGN PATENT DOCUMENTS

JP   10-246632    9/1998
JP   2005-24442   1/2005
(Continued)

OTHER PUBLICATIONS

International Search Report (ISR) issued on Sep. 1, 2020 in International (PCT) Application No. PCT/JP2020/025158.

*Primary Examiner* — Leon Viet Q Nguyen
(74) *Attorney, Agent, or Firm* — Wenderoth, Lind & Ponack, L.L.P.

(57) ABSTRACT

An imaging parameter output method is a method of outputting an imaging parameter of an imaging device that captures an image for measuring a displacement representing a movement of an object. The imaging parameter output method includes: obtaining object information identifying the object, and a geometric imaging condition for imaging the object; calculating the imaging parameter including a candidate imaging area for placing the imaging device and the accuracy in measuring the displacement in the candidate imaging area, based on the object information and the geometric imaging condition, without imaging the object using the imaging device; and outputting the imaging parameter.

14 Claims, 18 Drawing Sheets

(51) Int. Cl.
*G03B 35/08* (2021.01)
*G06V 20/10* (2022.01)

(56) References Cited

U.S. PATENT DOCUMENTS

| | | | |
|---|---|---|---|
| 2019/0178814 A1 | 6/2019 | Nakano et al. | |
| 2021/0350520 A1* | 11/2021 | Ohta | G06T 7/0004 |
| 2022/0146366 A1* | 5/2022 | Nakano | E01D 22/00 |

FOREIGN PATENT DOCUMENTS

| | | |
|---|---|---|
| JP | 2010-256276 | 11/2010 |
| JP | 2017-36979 | 2/2017 |
| JP | 2017-203701 | 11/2017 |
| JP | 2017-215306 | 12/2017 |
| JP | 6350923 | 7/2018 |
| WO | 2017/221965 | 12/2017 |

* cited by examiner

IMAGING PARAMETER OUTPUT METHOD AND IMAGING PARAMETER OUTPUT DEVICE

CROSS REFERENCE TO RELATED APPLICATIONS

This is a continuation application of PCT International Application No. PCT/JP2020/025158 filed on Jun. 26, 2020, designating the United States of America, which is based on and claims priority of Japanese Patent Application No. 2019-156048 filed on Aug. 28, 2019. The entire disclosures of the above-identified applications, including the specifications, drawings and claims are incorporated herein by reference in their entirety.

FIELD

The present disclosure relates to an imaging parameter output method and an imaging parameter output device that output the imaging parameters of an imaging device that captures an image for measuring a displacement representing the movement of an object.

BACKGROUND

An infrastructure structure such as a bridge has been inspected by operators regularly checking the bridge with eyes or by hammering tests. There is however a huge number of inspection points. Depending on the location of the structure, the checking work is difficult and puts a burden on the operators. To address the problem, inspection of a structure using cameras is suggested (see, e.g., Patent Literature (PTL) 1).

CITATION LIST

Patent Literature

PTL 1: International Publication No. WO 2017/221965

SUMMARY

Technical Problems

When measuring a displacement using the cameras, operators determine the combination between an imaging position of the focal length of a lens, for example, while checking them at an imaging site, which requires time for the work at the imaging site. The combination between the imaging position and the focal length of the lens influences the accuracy in measuring the displacement. If an operator needs to find out the combination between the imaging position and the focal length of the lens that meets a desired measurement accuracy, it takes more time for the work at the imaging site.

It is thus an objective of the present disclosure to suggest an imaging parameter output method and an imaging parameter output device that allow the measurement work at an imaging site in a shorter time at a desired measurement accuracy.

Solution to Problem

An imaging parameter output method according to an aspect of the present disclosure is a method of outputting an imaging parameter of an imaging device that captures an image for measuring a displacement representing a movement of an object. The imaging parameter output method includes: obtaining object information identifying the object, and a geometric imaging condition for imaging the object; calculating the imaging parameter including a candidate imaging area for placing the imaging device and a measurement accuracy in measuring the displacement in the candidate imaging area, based on the object information and the geometric imaging condition, without imaging the object using the imaging device; and outputting the imaging parameter.

An imaging parameter output method according to another aspect of the present disclosure is a method of outputting an imaging parameter of an imaging device that captures an image for measuring a displacement representing a movement of an object. The imaging parameter output method includes: obtaining object information identifying the object, and geographic information on an area including the object; calculating the imaging parameter including a candidate imaging area for placing the imaging device and a measurement accuracy in measuring the displacement in the candidate imaging area, based on the object information and the geographic information, without imaging the object using the imaging device; and outputting the imaging parameter.

An imaging parameter output method according to a further another aspect of the present disclosure is a method of outputting an imaging parameter of an imaging device that captures an image for measuring a physical quantity of an object. The imaging parameter output method includes: obtaining object information identifying the object, and a geometric imaging condition for imaging the object; calculating the imaging parameter including a candidate imaging area for placing the imaging device and a measurement accuracy in measuring the physical quantity of the object in the candidate imaging area, based on the object information and the geometric imaging condition, without imaging the object using the imaging device; and outputting the imaging parameter.

An imaging parameter output device according to an aspect of the present disclosure is for outputting an imaging parameter of an imaging device that captures an image for measuring a displacement representing a movement of an object or a physical quantity of the object. The imaging parameter output device includes: an obtainer that obtains object information identifying the object, and a geometric imaging condition for imaging the object; a calculator that calculates the imaging parameter including a candidate imaging area for placing the imaging device and a measurement accuracy in measuring the displacement in the candidate imaging area or a measurement accuracy in measuring the physical quantity of the object in the candidate imaging area, based on the object information and the geometric imaging condition, without imaging the object using the imaging device; and an outputter that outputs the imaging parameter.

An imaging parameter output device according to another aspect of the present disclosure is for outputting an imaging parameter of an imaging device that captures an image for measuring a displacement representing a movement of an object or a physical quantity of the object. The imaging parameter output device includes: an obtainer that obtains object information identifying the object, and geographic information on an area including the object; a calculator that calculates the imaging parameter including a candidate imaging area for placing the imaging device and a measurement accuracy in measuring the displacement in the candidate imaging area or a measurement accuracy in measuring the physical quantity of the object in the candidate imaging area, based on the object information and the geographic information, without imaging the object using the imaging device; and an outputter that outputs the imaging parameter.

Advantageous Effects

The imaging parameter output method, for example, according to the aspects of the present disclosure allows the measurement work at an imaging site in a shorter time at a desired measurement accuracy.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Outline of Present Disclosure

Figure 18:
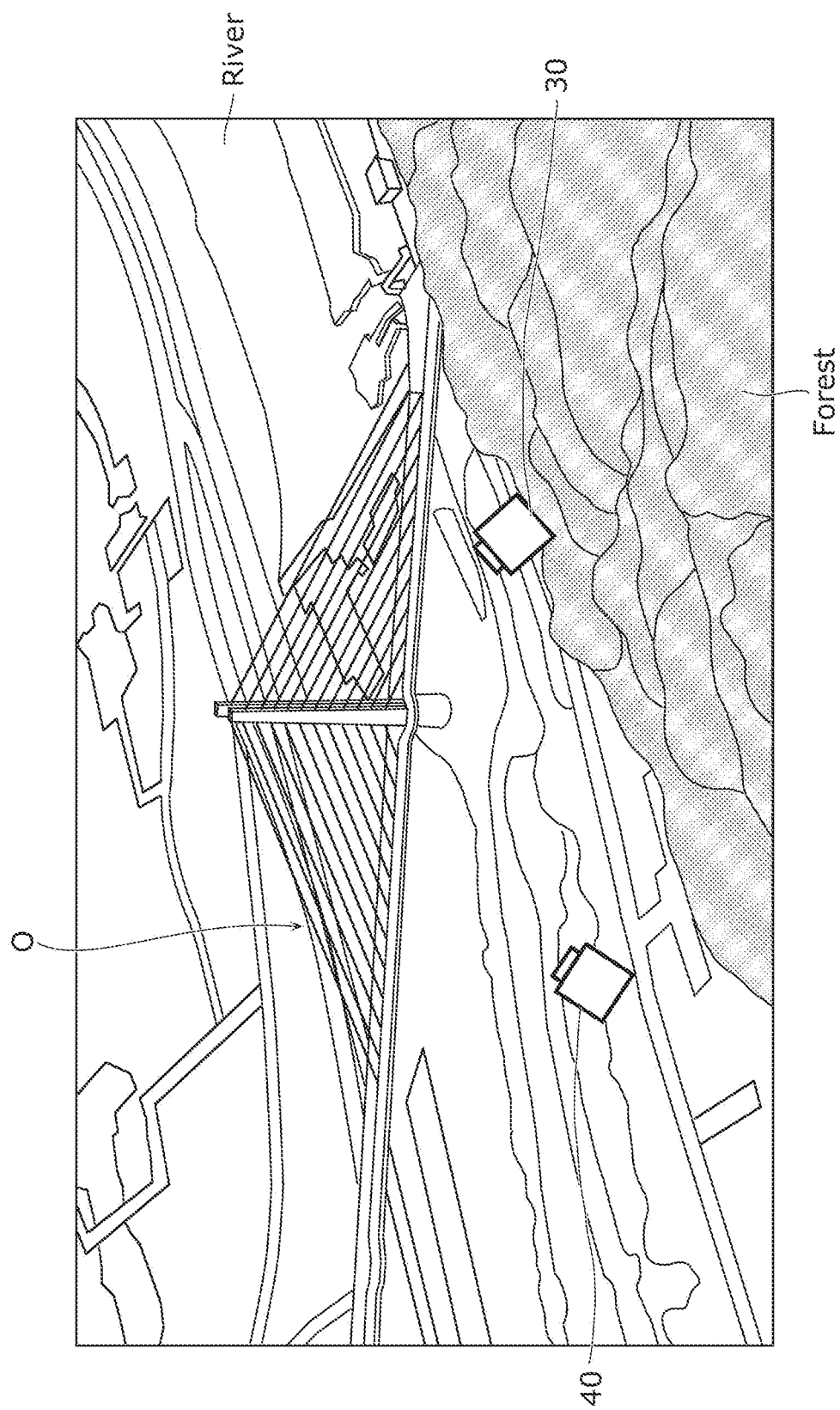
FIG. 18 is a schematic view illustrating displacement measurement using imaging devices.

Measurement of a displacement of structure O using imaging devices (e.g., cameras) will be described with reference to FIG. 18. FIG. 18 is a schematic view illustrating displacement measurement using imaging devices. FIG. 18 shows imaging of structure O using two imaging devices of first and second imaging devices 30 and 40. The number of imaging devices is not limited to two, and may be one, three, or more. In addition, the displacement of structure O is an example physical quantity of structure O.

As shown in FIG. 18, in the measurement of the displacement of structure O using the imaging devices, structure O is imaged from a point around structure O using the imaging devices, the displacement of structure O is measured based on images obtained by the imaging.

First and second imaging devices 30 and 40 capture images for measuring the displacement of structure O. First and second imaging devices 30 and 40 image structure O from points of view different from each other. The displacement of structure O is measured based on two images captured by first and second imaging devices 30 and 40 in synchronization with each other. Note that structure O is an example of the object whose displacement is to be measured, and is, for example, an infrastructure structure such as a bridge. Structure O is, for example, a bridge on which vehicles such as automobiles or trains travel, but not limited thereto. Structure O may be, for example, a steel tower, building, factory/plant, or machinery equipment.

Note that first and second imaging devices 30 and 40 are black and white cameras, for example, but may be color cameras. First and second imaging devices 30 and 40 are, for example, digital video cameras or digital still cameras including an image sensor.

In this manner, when imaging structure O using an imaging device, the operator finds out an imaging position at which structure O is imageable at the imaging site around structure O, and selects a lens with a focal length corresponding to the imaging position. The operator needs time for the operation such as combining the imaging position and the focal length of the lens at the imaging site. The combination between the imaging position and the focal length of the lens influences the accuracy in measuring the displacement of structure O. Thus, the operator further needs more time to find out the combination between the imaging position and the focal length of the lens, for example, for obtaining a desired measurement accuracy. With an increasing number of imaging devices, the combination between the imaging position and the focal length of the lens becomes complex, whereby the operator needs more time for the work.

To address the problems, the present inventors have eagerly studied an imaging parameter output method, for example, that allows the measurement work at an imaging site in a shorter time at a desired measurement accuracy. As a result, the present inventors have conceived of the following imaging parameter output method, for example.

An imaging parameter output method according to an aspect of the present disclosure is a method of outputting an imaging parameter of an imaging device that captures an image for measuring a displacement representing a movement of an object. The imaging parameter output method includes: obtaining object information identifying the object, and a geometric imaging condition for imaging the object; calculating the imaging parameter including a candidate imaging area for placing the imaging device and a measurement accuracy in measuring the displacement in the candidate imaging area, based on the object information and the geometric imaging condition, without imaging the object using the imaging device; and outputting the imaging parameter.

With this method, the operator knows the imaging parameters including the candidate imaging area and the accuracy in displacement measurement in advance. The operator thus finds out the combination between the imaging position and the focal length of the lens, for example, at the imaging site in a shorter time. The operator performs imaging in a candidate imaging area which provides the measurement accuracy suitable for the object. This allows the measurement of the displacement with a desired measurement accuracy. Accordingly, the imaging parameter output method according to the aspect of the present disclosure allows the measurement work at the imaging site in a shorter time at a desired measurement accuracy.

For example, the imaging parameter output method further includes: obtaining geographic information on an area including the object. The calculating includes calculating the imaging parameter further based on the geographic information.

This allows the operator to determine the candidate imaging position for measuring the displacement of the object in view of the geographic information. The operator determines the candidate imaging position in view of the landform around the object, for example.

For example, the calculating includes calculating the imaging parameter including the candidate imaging area obtained by excluding, from a target area for placing the imaging device, an imaging impossible area in which the imaging device cannot perform imaging, the target area being calculated based on the object information and the geometric imaging condition, the imaging impossible area being obtained based on the geographic information.

This allows the operator to easily know an area in which imaging is actually possible.

For example, the candidate imaging area includes a candidate imaging position. The imaging parameter further includes a first check image for checking a view of the object from the candidate imaging position.

This allows the operator to check the presence or absence of an obstacle between the object and the candidate imaging position before going to the imaging site. The operator selects, as the candidate imaging position, one of the candidate imaging areas without any obstacle to determine a more proper candidate imaging position.

For example, the imaging parameter output method further includes: receiving an operation for changing the candidate imaging position to a new candidate imaging position; and updating the first check image included in the imaging parameter to a second check image of the object as viewed from the new candidate imaging position.

This allows the operator to easily check the presence or absence of an obstacle between the object and the new candidate imaging position.

For example, the imaging parameter output method further includes: obtaining a desired measurement accuracy in measuring the displacement in the candidate imaging area. The candidate imaging area meets the desired measurement accuracy.

This allows the operator to easily know the area meeting a desired measurement accuracy.

For example, the imaging parameter output method further includes: obtaining environment information indicating environment at a time of imaging the object. The imaging parameter includes information on a candidate schedule for imaging the object according to the environment information.

This allows the operator to know the candidate schedule for the imaging. The candidate schedule is useful for determining the schedule for the imaging.

For example, the geometric imaging condition includes at least one of a range of imaging the object, lens information on a lens applicable to the imaging device, or information on a sensor of the imaging device.

This allows calculation of the candidate imaging area and the accuracy in measuring the displacement using at least one of the range of imaging the object, the lens information on the lens applicable to the imaging device, or the information on the sensor of the imaging device. Accordingly, the measurement accuracy is more accurately calculated than in the case without using the range of imaging the object, the lens information on the lens applicable to each imaging device, or the information on the sensor of the imaging device, for example.

For example, the imaging device includes a first imaging device and a second imaging device that image the object from points of view different from each other. The geometric imaging condition further includes at least one of a baseline length between the first imaging device and the second imaging device or a convergence angle formed by the first imaging device and the second imaging device.

This allows the operator to obtain the imaging parameters even in the case where the operation is complicated at the imaging site, and further reduces the time required for combining the imaging position and the focal length of the lens, for example, at the imaging site.

An imaging parameter output method according to another aspect of the present disclosure is a method of outputting an imaging parameter of an imaging device that captures an image for measuring a displacement representing a movement of an object. The imaging parameter output method includes: obtaining object information identifying the object, and geographic information on an area including the object; calculating the imaging parameter including a candidate imaging area for placing the imaging device and a measurement accuracy in measuring the displacement in the candidate imaging area, based on the object information and the geographic information, without imaging the object using the imaging device; and outputting the imaging parameter.

With this method, the operator knows a candidate imaging area in advance, even if it is difficult to find out an imaging position at an imaging site due to a peculiar landform around the object, for example. Accordingly, the imaging parameter output method according to the aspect of the present disclosure allows the operator to find out the combination between the imaging position and the focal length of the lens, for example, at the imaging site in a shorter time, even if it is difficult to find out the imaging position at the imaging site. In addition, the operator performs the imaging in a candidate imaging area that provides the measurement accuracy suitable for the object to measure the displacement at a desired measurement accuracy.

An imaging parameter output method according to further another aspect of the present disclosure is a method of outputting an imaging parameter of an imaging device that captures an image for measuring a physical quantity of an object. The imaging parameter output method includes: obtaining object information identifying the object, and a geometric imaging condition for imaging the object; calculating the imaging parameter including a candidate imaging area for placing the imaging device and a measurement accuracy in measuring the physical quantity of the object in the candidate imaging area, based on the object information and the geometric imaging condition, without imaging the object using the imaging device; and outputting the imaging parameter.

With this method, the operator knows a candidate imaging area before capturing an image for measuring the physical quantity, even if it is difficult to find out an imaging position at an imaging site due to a peculiar landform around the object, for example. Accordingly, the imaging parameter output method according to the aspect of the present disclosure allows the operator to find out the combination between the imaging position and the focal length of the lens, for example, at the imaging site in a shorter time, even if it is difficult to find out the imaging position at the imaging site. In addition, the operator performs the imaging in a candidate imaging area that provides the measurement accuracy suitable for the object to measure the physical quantity at a desired measurement accuracy.

An imaging parameter output device according to an aspect of the present disclosure is for outputting an imaging parameter of an imaging device that captures an image for measuring a displacement representing a movement of an object or a physical quantity of the object. The imaging parameter output device includes: an obtainer that obtains object information identifying the object, and a geometric imaging condition for imaging the object; a calculator that calculates the imaging parameter including a candidate imaging area for placing the imaging device and a measurement accuracy in measuring the displacement in the candidate imaging area or a measurement accuracy in measuring the physical quantity of the object in the candidate imaging area, based on the object information and the geometric imaging condition, without imaging the object using the imaging device; and an outputter that outputs the imaging parameter.

This configuration provides the same or similar advantages as the imaging parameter output method described above. The imaging parameter device according to the aspect of the present disclosure allow, for example, the measurement work at an imaging site in a shorter time at a desired measurement accuracy.

An imaging parameter output device according to another aspect of the present disclosure is for outputting an imaging parameter of an imaging device that captures an image for measuring a displacement representing a movement of an object or a physical quantity of the object. The imaging parameter output device includes: an obtainer that obtains object information identifying the object, and geographic information on an area including the object; a calculator that calculates the imaging parameter including a candidate imaging area for placing the imaging device and a measurement accuracy in measuring the displacement in the candidate imaging area or a measurement accuracy in measuring the physical quantity of the object in the candidate imaging area, based on the object information and the geographic information, without imaging the object using the imaging device; and an outputter that outputs the imaging parameter.

This configuration provides the same or similar advantages as the imaging parameter output method described above. The imaging parameter device according to the aspect of the present disclosure allows, for example, the operator to find out the combination between an imaging position and the focal length of the lens at an imaging site in a shorter time and to measure the displacement at a desired measurement accuracy, even if it is difficult to find out the imaging position at the imaging site, for example.

These general and specific aspects may be implemented using a system, a method, an integrated circuit, a computer program, or a non-transitory computer-readable recording medium such as a compact disc read-only memory (CD-ROM), or any combination of systems, methods, integrated circuits, computer programs, or recording media. The programs may be stored in advance in a recoding medium or supplied to the recoding medium via a wide-area communication network such as the Internet.

Now, embodiments will be described in detail with reference to the drawings.

Note that the embodiments and variations described below are mere comprehensive or specific examples of the present disclosure. The numerical values, shapes, materials, constituent elements, the arrangement and connection of the constituent elements, steps, step orders etc. shown in the following embodiments and variations are thus mere examples, and are not intended to limit the scope of the present disclosure. Among the constituent elements in the following embodiments, those not recited in any of the independent claims defining the broadest concept of the present disclosure are described as optional constituent elements.

The figures are schematic representations and not necessarily drawn strictly to scale. In the figures, substantially the same constituent elements are assigned with the same reference marks, and redundant descriptions may be omitted or simplified.

In this specification, the terms such as "the same" representing relations between elements and the numerical values not only represent the exact meaning and values but also cover the substantially equal range such as errors of several percent.

In the following description, images are still images but may be moving images.

Embodiment 1

Now, an imaging parameter output method, for example, according to this embodiment will be described with reference to FIGS. 1 to 5.

1-1. Configuration of Imaging Parameter Output System

Figure 1:
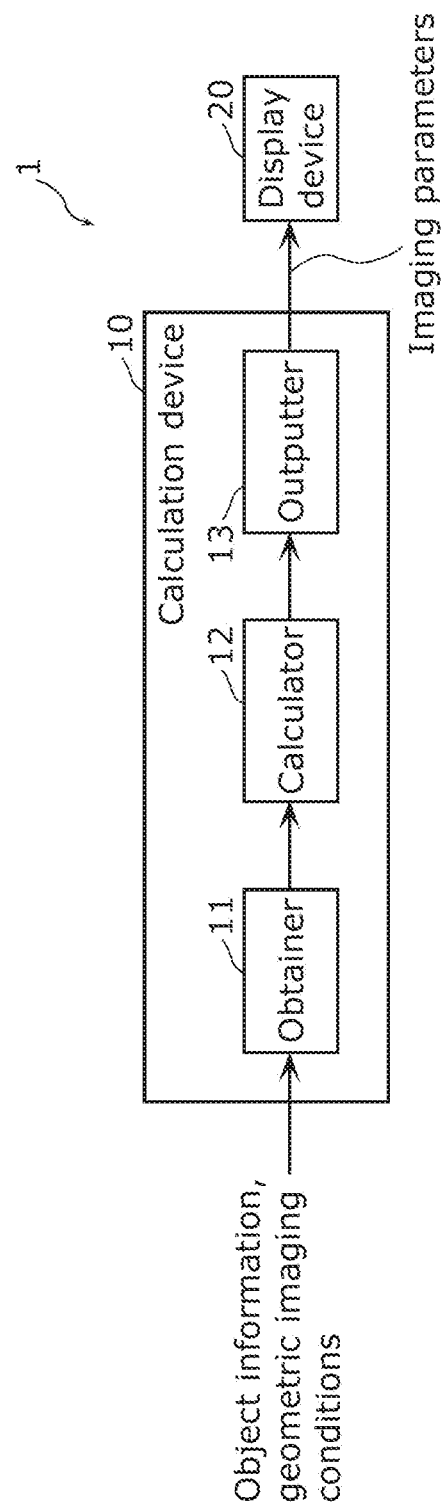
FIG. 1 is a block diagram showing a functional configuration of an imaging parameter output system according to Embodiment 1.

First, imaging parameter output system 1 will be described with reference to FIG. 1. Imaging parameter output system 1 includes an imaging parameter output device that executes the imaging parameter output method according to this embodiment. FIG. 1 is a block diagram showing a functional configuration of imaging parameter output system 1 according to this embodiment. An example will be described below where imaging parameter output system 1 outputs imaging parameters of two imaging devices used for measuring the displacement of structure O. The displacement in this specification includes not only the amount of positional change of structure O but also a deformation and a vibration of structure O.

As shown in FIG. 1, imaging parameter output system 1 is an information processing system that outputs the imaging parameters based on object information and geometric imaging conditions. The object information is for identifying a target whose displacement is to be measured. Imaging parameter output system 1 outputs the imaging parameters, for example, before imaging structure O. Imaging parameter output system 1 includes, for example, calculation device 10 and display device 20.

Calculation device 10 is an information processing device that calculates imaging parameters based on the object information and the geometric imaging conditions. The imaging parameters include a candidate imaging area of each imaging device for measuring the displacement of structure O, and the accuracy in measuring the displacement in the candidate imaging area. Calculation device 10 includes obtainer 11, calculator 12, and outputter 13. Calculation device 10 is an example of "imaging parameter output device".

Obtainer 11 obtains the object information and the geometric imaging conditions. Obtainer 11 may be a communication interface (or a communication circuit) communicatively connected to an external device via wired or wireless communications. In this case, calculation device 10 obtains the object information and the geometric imaging conditions input to the external device by an operator, for example, via communications. Obtainer 11 may be a user interface such as a hardware key (or a hardware button), a slide switch, or a touch panel. In this case, calculation device 10 obtains the object information and the geometric imaging conditions directly input by the operator. Note that the operator is an example of the "user".

Figure 2:
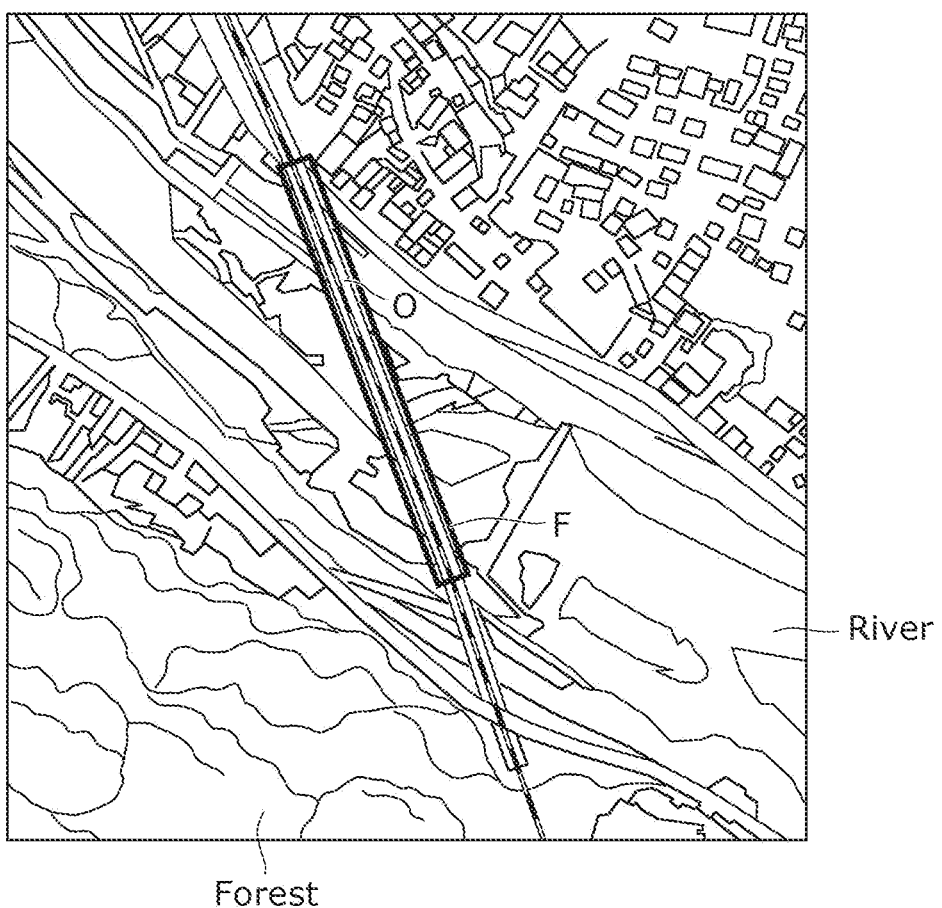
FIG. 2 shows example object information according to Embodiment 1.

Now, the object information obtained by obtainer 11 will be described with reference to FIG. 2. FIG. 2 shows example object information according to this embodiment.

As shown in FIG. 2, the object information may indicate the range of imaging structure O. That is, the object information may indicate the range of measuring the position of structure O or a displacement of structure O. The object information may be shown in rectangular box F indicating the imaging range on a map, for example. Accordingly, the size of the measuring range (e.g., the size of structure O) and the position are obtainable.

As long as capable of identifying structure O, the object information may be other than what has been described above. The object information may be, for example, the latitude, longitude, or height (e.g., above sea level) of structure O. If whole structure O falls within the displacement measuring range, the object information may be the name of structure O.

The geometric imaging conditions are for determining the form of an image of structure O appearing on each of imaging elements of the imaging devices (e.g., first and second imaging devices 30 and 40) when structure O is imaged. In other words, the geometric imaging conditions are for determining what kind of image of structure O appears on the imaging element. The geometric imaging conditions are for determining, for example, the size and/or blurring of the image of structure O appearing on the imaging device. The geometric imaging conditions include at least one of the size of the measuring range (e.g., the angle of view), the focal lengths of the optical systems, the diaphragm (e.g., the f-number), the sensor specifications, the desirable convergence angles, or the maximum baseline length. In this manner, the geometric imaging conditions may include the conditions related to what is called "camera parameters".

The size of the measuring range may include the width of the measuring range, for example, and may be determined based on rectangular box F. The angle of view is the angle (e.g., θ21 or θ22 in FIG. 4) to be imaged by each camera. The focal lengths of the optical systems correspond to the focal lengths of lenes attachable to the imaging devices, for example. The diaphragm is the f-number, for example, and set to obtain a desired depth of field. The sensor specifications include at least two of the resolution (i.e., the pixel number), the pixel size, or the sensor size. The convergence angles are formed by the two imaging devices, and are, for example, convergence angles θ11 to θ13 shown in FIG. 4 which will be described later. The desirable convergence angles improve the measurement accuracy. Each angle may be a predetermined angle (e.g., 90°) or an angle range (e.g., 80° to 90°). Each desirable convergence angle may be measured at a predetermined position of structure O (e.g., the center of structure O). The baseline length is the length of the straight line (baseline) connecting the two imaging devices, and is, for example, baseline length L shown in FIG. 4 which will be described later. The maximum baseline length may be the length of a cable connecting the two imaging devices, for example. That is, the baseline length may be the maximum distance between the two imaging devices, and may be, for example, 100 m or less. The cable may be for transmitting signals for synchronizing the imaging times of the two imaging devices. If a single imaging device is used to measure the displacement, the geometric imaging conditions may include neither the desirable convergence angles nor the maximum baseline length. Similarly, if the imaging times of the two imaging devices are synchronized without using the cable described above, the geometric imaging conditions may include no maximum baseline length.

Referring back to FIG. 1, calculator 12 calculates the imaging parameters of the imaging devices for measuring the displacement of structure O, based on the object information and the geometric imaging conditions. The imaging parameters include the candidate imaging area of each imaging device and the accuracy in measuring the displacement in the candidate imaging area. The candidate imaging area is a candidate area for placing the imaging device to image structure O. The candidate imaging area may be an area or an exact position (i.e., a candidate imaging position which will be described later) for placing the imaging device. The imaging parameters may include the orientation of each imaging device, the focal length (or the type) of the lens, the diaphragm, the type (e.g., sensor specifications including the pixel number, the sensor size, and the pixel size) of the camera. The imaging parameters may include an image indicating the candidate imaging area of each imaging device and the accuracy in measuring the displacement in the candidate imaging area. That is, calculator 12 may generate an image indicating the candidate imaging area of each imaging device and the accuracy in measuring the displacement in the candidate imaging area. The "accuracy in measuring the displacement in the candidate imaging area" corresponds to the accuracy in measuring the displacement based on an image of structure O captured in the candidate imaging area.

Outputter 13 outputs, to display device 20, the imaging parameters calculated by calculator 12. How outputter 13 outputs the imaging parameters is not particularly limited. Outputter 13 may output the imaging parameters to display device 20 via wired or wireless communications or via a detachable memory (e.g., a USB memory). Outputter 13 is, for example, a communication interface communicatively connected to display device 20 via wired or wireless communications.

Display device 20 obtains the imaging parameters from calculation device 10 and outputs the obtained imaging parameters as an image. The image includes a photograph, an illustration, or characters. Display device 20 is a liquid crystal display, for example. The image output by display device 20 is visible to an operator and used by the operator to consider the candidate imaging position that is the candidate position for imaging structure O.

Display device 20 may be a stationary device or a device included in a portable terminal owned by the operator. The portable terminal is not particularly limited as long as including display device 20 and being communicative with calculation device 10, and may be a smartphone or a tablet, for example. If the portable terminal includes display device 20, the operator checks the imaging parameters on display device 20 of the portable terminal around structure O. Assume that the imaging parameters are updated when the operator is around structure O. The operator then checks the updated imaging parameters on the portable terminal.

Note that display device 20 is an example presentation device. Imaging parameter output system 1 may include, as a presentation device, a device that outputs sound together with or in place of display device 20. Imaging parameter output system 1 may include, as a presentation device, a device, such as a projector, displaying presentation information on an object (e.g., a screen). If calculation device 10 is located in a remote area, calculation device 10 and display device 20 may be connected via a network.

1-2. Operation of Imaging Parameter Output System

Figure 3:
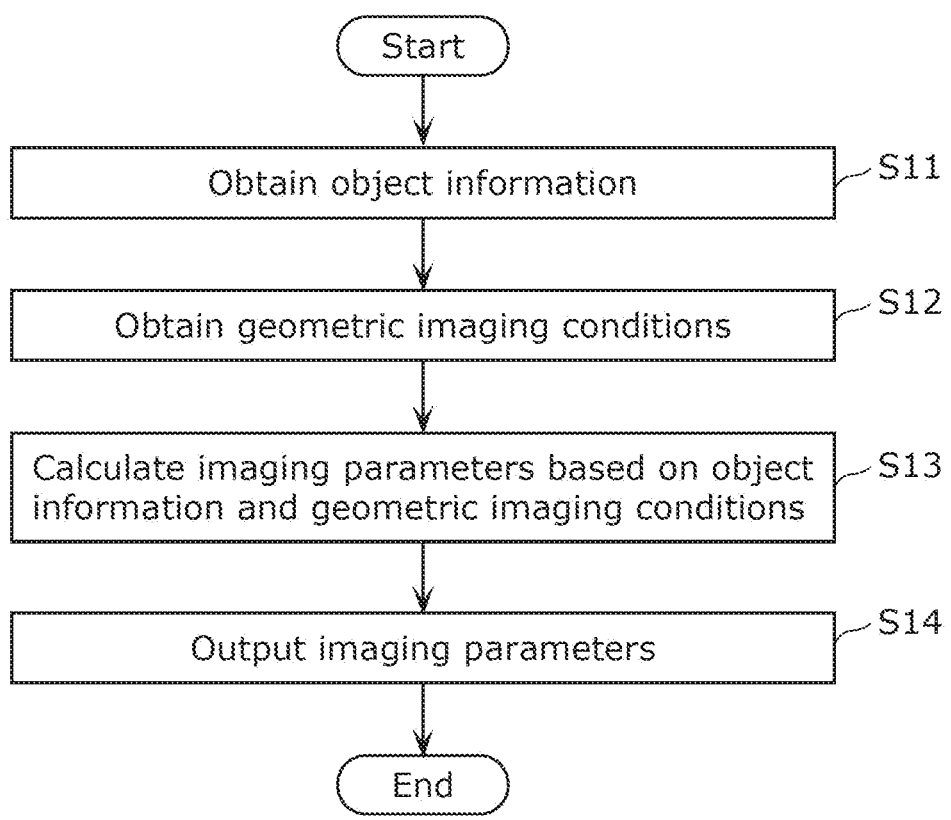
FIG. 3 is a flowchart showing an operation of a calculation device according to Embodiment 1.

Now, an operation of imaging parameter output system 1 will be described with reference to FIGS. 3 to 5. Specifically, an operation of calculation device 10 will be described. FIG. 3 is a flowchart showing the operation of calculation device 10 according to this embodiment. Calculation device 10 may execute the operation shown in FIG. 3 in advance before an operator goes imaging structure O, for example.

As shown in FIG. 3, obtainer 11 obtains object information (S11). For example, obtainer 11 obtains, as the object information corresponding to structure O, rectangular box F shown on a map as in FIG. 2.

Obtainer 11 obtains geometric imaging conditions (S12). In step S12, obtainer 11 may obtain the geometric imaging conditions from an external device via communications. Alternatively, obtainer 11 may receive, out of a plurality of geometric imaging conditions stored in the storage (not shown) of calculation device 10, one(s) used for imaging structure O.

Note that steps S11 and S12 are an example of "obtaining object information . . . and a geometric imaging condition".

Note that the times of obtaining the object information and the geometric imaging conditions are not particularly limited. The object information and the geometric imaging conditions may be obtained at the same time or at different times.

Obtainer 11 outputs the obtained object information and geometric imaging conditions to calculator 12.

Calculator 12 calculates the imaging parameters for imaging structure O based on the object information and geometric imaging conditions obtained from obtainer 11 (S13). That is, calculator 12 calculates the imaging parameters of first and second imaging devices 30 and 40 for imaging structure O based on the object information and geometric imaging conditions obtained from obtainer 11. The imaging parameters include the information indicating candidate imaging areas for placing first and second imaging devices 30 and 40 and the accuracies in measuring the displacement in the candidate imaging areas. Step S13 is an example of "calculating".

Now, the calculation of the imaging parameters by calculator 12 will be described with reference to FIG. 4. FIG. 4 shows example calculation of the imaging parameters according to this embodiment. Note that FIG. 4 is a view of structure O from above. As shown in FIG. 4, assume that the geometric imaging conditions including the following are obtained in step S12. The width of structure O is 100 m. The maximum baseline length is 100 m. The desirable convergence angle $\theta 11$ is 90°. The focal lengths of the optical systems of the imaging devices are 14 mm, 24 mm, and 50 mm. The resolution is 4K. The pixel size is 5.5 μm. Convergence angle $\theta 11$ is, for example, the angle at the center of structure O.

Figure 4:
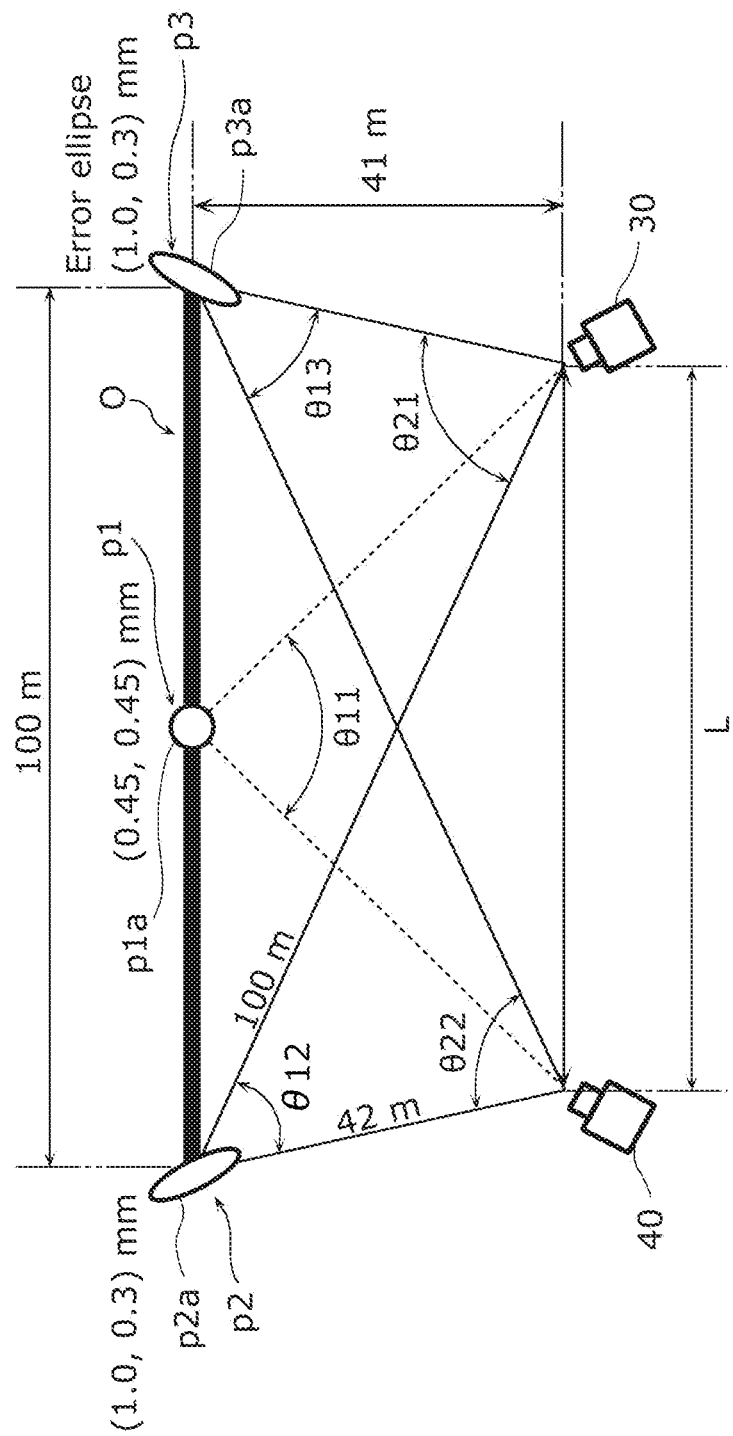
FIG. 4 shows example calculation of imaging parameters according to Embodiment 1.

In the example of FIG. 4, the focal length of an optical system is 14 mm, and the angle of view at this time is 78°. While first and second imaging devices 30 and 40 have the same configuration, but the configurations are not limited thereto. First and second imaging devices 30 and 40 have detection accuracy of 1/50 pixel, for example. Each of first and second imaging devices 30 and 40 has a predetermined detection accuracy.

As shown in FIG. 4, calculator 12 sets the locations of first and second imaging devices 30 and 40 based on the geometric imaging conditions. Calculator 12 sets the locations of first and second imaging devices 30 and 40 to image structure O within the imaging range under the following conditions, for example. Convergence angle $\theta 11$ at position p1, which is the center of structure O, is 90°. Each of angle $\theta 21$ of view of first imaging device 30 and angle $\theta 22$ of view of second imaging device 40 is 78°. Baseline length L is 100 m or less. In the example of FIG. 4, baseline length L is 82 m.

Calculator 12 then calculates the accuracy in measuring the displacement based on the images captured in the locations set as described above. For example, calculator 12 calculates the accuracy in measuring the displacement in a composite image obtained by compositing the respective images captured by first and second imaging devices 30 and 40. For example, calculator 12 calculates a displacement measurement error in the composite image based on the detection accuracy and the distance to structure O. FIG. 4 shows error ellipses as p1a to p3a. The value of each error ellipse is obtained by converting 1/50 pixel into the actual size on the measurement target. The error is here the value indicating the actual size. It is found from error ellipse p1a that the errors in measuring the displacement at position p1, which is the center of structure O, are 0.45 mm both in the vertical and horizontal directions on the paper in FIG. 4. In this manner, the errors in the depth and width directions are well balanced at a position where convergence angle $\theta 11$ is 90°.

As the object information and geometric imaging conditions described above, the imaging parameters (a combination of the imaging position, the orientation, and the focal length (i.e., the lens type)) are set temporarily. The convergence angle, the baseline length, and the measurement accuracy are calculated geometrically at position p1. With the temporary setting, whether the imaging range includes the object can be determined. Based on the obtained calculation result (e.g., the convergence angle, the baseline length, the imaging range, the measurement accuracy etc.), the adequacy of the temporarily set imaging parameters is evaluated. The imaging parameters causing optimal or quasi-optimal evaluation values are output from the system. The optimal or quasi-optimal parameters are determined by full parameter search, a nonlinear optimization method, or other means.

The vertical direction on the paper in FIG. 4 corresponds to the depth of structure O as viewed from each imaging device. In addition, the width on the paper in FIG. 4 is parallel to the direction (e.g., the horizontal direction) in which structure O extends.

Calculator 12 calculates a displacement measurement error at each of position p2 and position p3. Position p2 is located at one end of structure O, whereas position p3 is located at the other end of structure O. The displacement measurement error at each of positions p2 and p3 of structure O is for example, as follows. The depth is 1.0 mm and the width is 0.3 mm from each of error ellipses p2a and p3a. At each of positions p2 and p3, the distances from first and second imaging devices 30 and 40 are different from each other, the measurement error is thus represented by the error ellipse shown in FIG. 4. In the example of FIG. 4, each of convergence angle θ12 at position p2 and convergence angle θ13 at position p3 is 53°, for example.

Calculator 12 changes the positions of first and second imaging devices 30 and 40 based on the geometric imaging conditions, and calculates a displacement measurement error at each position. In this embodiment, the focal lengths of the optical systems are 14 mm, 24 mm, and 50 mm. Calculator 12 may calculate the displacement measurement error based on each of the focal lengths of the optical systems. Calculator 12 calculates the displacement measurement error based on each lens, for example, Accordingly, the measurement error is obtainable in each of the locations of first and second imaging devices 30 and 40.

Note that the diaphragm of first imaging device 30 may be set to focus the captured image within the range between first and second distances, for example, where the first distance extends from first imaging device 30 to position p2 and the second distance extends from first imaging device 30 to position p3. On the other hand, the diaphragm of second imaging device 40 may be set to focus the captured image within the range between third and fourth distances, for example, where the third distance extends from second imaging device 40 to position p2 and the fourth distance extends from second imaging device 40 to position p3.

Referring back to FIG. 3, outputter 13 outputs the imaging parameters calculated in step S13 (S14). In this embodiment, outputter 13 outputs the imaging parameters to external display device 20. Display device 20 then displays the imaging parameters obtained from outputter 13. Step S14 is an example of "outputting".

Now, imaging parameters 50 displayed by display device 20 will be described with reference to FIG. 5. That is, imaging parameters 50 output from calculation device 10 will be described with reference to FIG. 5. FIG. 5 shows example imaging parameters 50 according to this embodiment. Specifically, the figure shows imaging parameters 50 displayed by display device 20.

Figure 5:
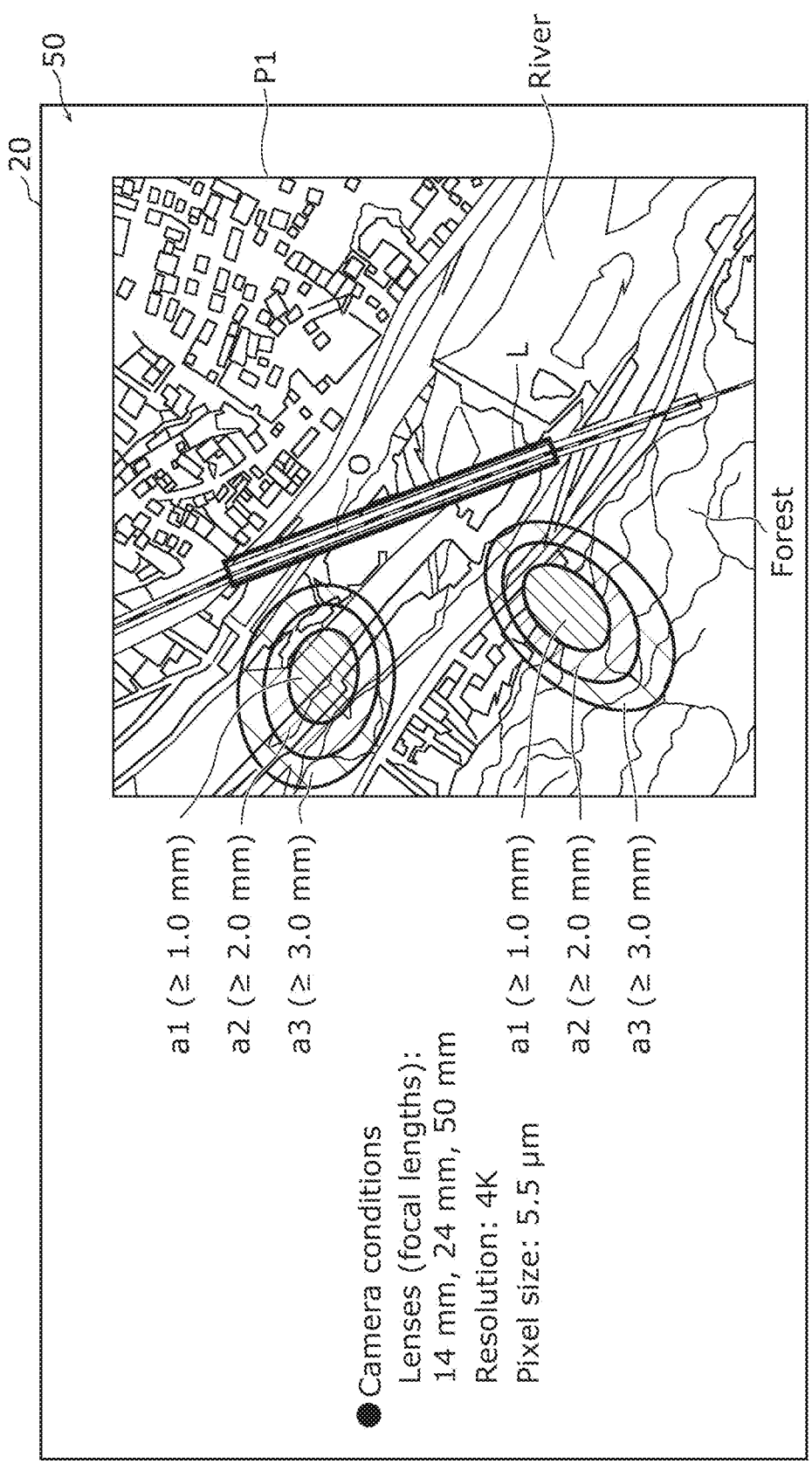
FIG. 5 shows example imaging parameters according to Embodiment 1.

As shown in FIG. 5, imaging parameters 50 include, for example, "camera conditions" and image P1. The "camera conditions" are the geometric conditions of first and second imaging devices 30 and 40. Image P1 shows a candidate imaging area and the accuracy in measuring the displacement. The camera conditions are the geometric imaging conditions used for calculating the candidate imaging area and the accuracy in measuring the displacement. For example, the camera conditions include at least some of the geometric imaging conditions obtained in step S12. The camera conditions may include information for identifying a camera for use (e.g., the model number of the camera).

For example, image P1 is obtained by superimposing candidate imaging areas a1 to a3 and the accuracies in measuring the displacement in candidate imaging areas a1 to a3 on a map including structure O. In FIG. 5, each hatched area is any of candidate imaging areas a1, a2, and a3. Candidate imaging areas a1 to a3 located below on the paper are the areas for placing one of first and second imaging devices 30 and 40, for example. Candidate imaging areas a1 to a3 located above on the paper are the areas for placing the other of first and second imaging devices 30 and 40, for example.

For example, candidate imaging areas a1 to a3 provide different accuracies in measuring the displacement. Candidate imaging area a1 has a displacement measurement error of 1.0 mm or less. That is, the error is 1.0 mm or less in measuring the displacement of structure O based on the image obtained by imaging structure O within candidate imaging area a1.

Candidate imaging area a2 has a displacement measurement error larger than 1.0 mm but not larger than 2.0 mm. That is, the error is larger than 1.0 mm but not larger than 2.0 mm in measuring the displacement of structure O based on the image obtained by imaging structure O within candidate imaging area a2. Candidate imaging area a3 has a displacement measurement error larger than 2.0 mm but not larger than 3.0 mm, for example. That is, the error is larger than 2.0 mm but not larger than 3.0 mm in measuring the displacement of structure O based on the image obtained by imaging structure O within candidate imaging area a3. Note that the accuracies in measuring the displacement in candidate imaging areas a1 to a3 may overlap at least partially.

In this manner, it can be said that image P1 shows a distribution of the measurement error.

The error is here, for example, the value (i.e., a representative error) calculated based on two or more errors calculated by calculator 12. In the example of FIG. 4, the representative error is calculated based on six errors at positions p1 to p3. The representative error is not particularly limited but may be the maximum value, the minimum value, the mean value, the median, or the mode of two or more errors, or a value obtained by predetermined calculation such as weighted averaging.

Note that candidate imaging areas a1 to a3 for image P1 may have the same displacement measurement error (e.g., 1.0 mm or less) but may be imageable by different optical systems (e.g., lenses). For example, candidate imaging area a1 may be an area imageable by an optical system with a focal length of 14 mm. Candidate imaging area a2 may be an area imageable by an optical system with a focal length of 24 mm. Candidate imaging area a3 may be an area imageable by an optical system with a focal length of 50 mm. An "imageable" area has, for example, a displacement measurement error of a predetermined value or less (e.g., 3.0 mm or less).

An operator checks imaging parameters 50 displayed on display device 20 to know the range of capturing an image showing the displacement, for example, at a desired measurement accuracy. The operator knows the range of an acceptable error in measuring structure O, for example.

Note that imaging parameters 50 not necessarily show the ranges as shown in image P1. The candidate imaging areas included in image P1 may be exact positions. For example, a position with the minimum displacement measurement error and information (e.g., the value) indicating the measurement error at the position may be shown as a candidate imaging area in image P1.

In this manner, imaging parameters 50 include information making the accuracy in measuring the displacement visible, for example, the information for allowing the operator to easily select a candidate imaging position. For example, imaging parameters 50 include image P1. This allows the operator to easily view a result of calculation by calculation device 10. For example, the operator easily determines a candidate imaging position of an imaging device for imaging structure O.

Variation 1 of Embodiment 1

Now, an imaging parameter output method, for example, according to this variation will be described with reference to FIGS. 6 and 7. In the following, the differences from Embodiment 1 will be described mainly. The same reference signs as those in Embodiment 1 are used to represent equivalent elements, and the detailed explanation thereof may be omitted or simplified. An imaging parameter output system according to this variation has the same configuration as imaging parameter output system 1 according to Embodiment 1. The explanation thereof will thus be omitted.

Figure 6:
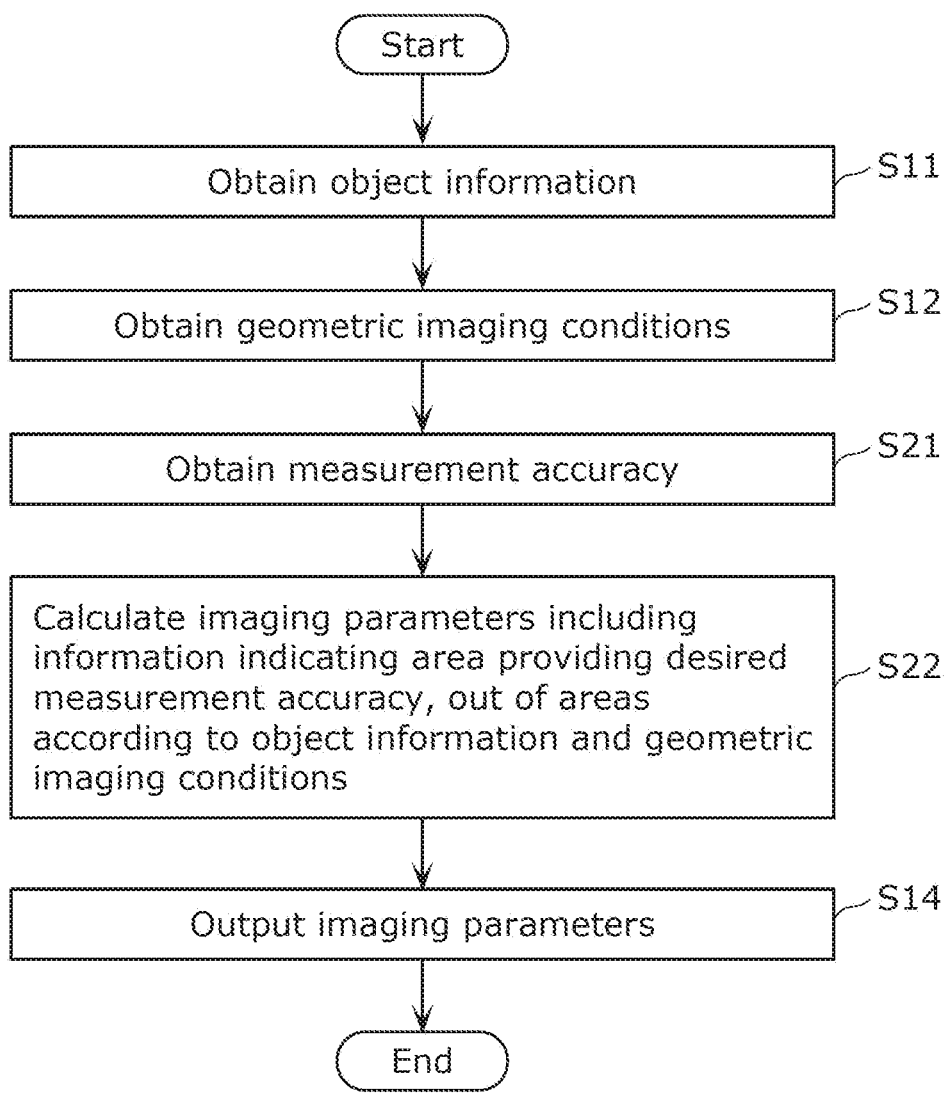
FIG. 6 is a flowchart showing an operation of a calculation device according to Variation 1 of Embodiment 1.

FIG. 6 is a flowchart showing an operation of calculation device 10 according to this variation. Note that steps S11, S12, and S14 are the same as in Embodiment 1 shown in FIG. 3, and the explanation thereof will thus be omitted.

As shown in FIG. 6, in addition to the processing according to Embodiment 1, obtainer 11 of calculation device 10 according to this variation obtains a measurement accuracy desired by the operator (S21). For example, obtainer 11 may obtain the measurement accuracy from an external device. If a storage (not shown) of calculation device 10 stores the accuracy in measuring structure O, obtainer 11 may read the accuracy in measuring structure O, which is identified by the object information obtained in step S11, from the storage, to obtain the measurement accuracy. In this variation, assume that the information indicating that the desired measurement error is 1.0 mm or less is obtained as the measurement accuracy. Obtainer 11 outputs the obtained measurement accuracy to calculator 12. Step S21 is an example of "obtaining a desired measurement accuracy".

Next, calculator 12 calculates the imaging parameters including the information indicating an area meeting a desired measurement accuracy, out of the areas according to the object information and the geometric imaging conditions (S22). For example, calculator 12 calculates an area for each measurement error as shown in image P1 of FIG. 5. For example, assume that calculator 12 calculates an area with a measurement error of 1.0 mm or less, an area with a measurement error larger than 1.0 mm but not larger than 2.0 mm, and an area with a measurement error larger than 2.0 mm but not larger than 3.0 mm. Calculator 12 then determines, as a candidate imaging area, an area meeting a desired measurement accuracy obtained in step S21 among the two or more calculated areas. For example, calculator 12 determines, as a candidate imaging area, only the area with a measurement error of 1.0 mm or less among the three areas described above.

Now, imaging parameters 51 displayed by display device 20 will be described with reference to FIG. 7. That is, imaging parameters 51 output from calculation device 10 will be described with reference to FIG. 7. FIG. 7 shows example imaging parameters 51 according to this variation. Specifically, the figure shows imaging parameters 51 displayed by display device 20.

Figure 7:
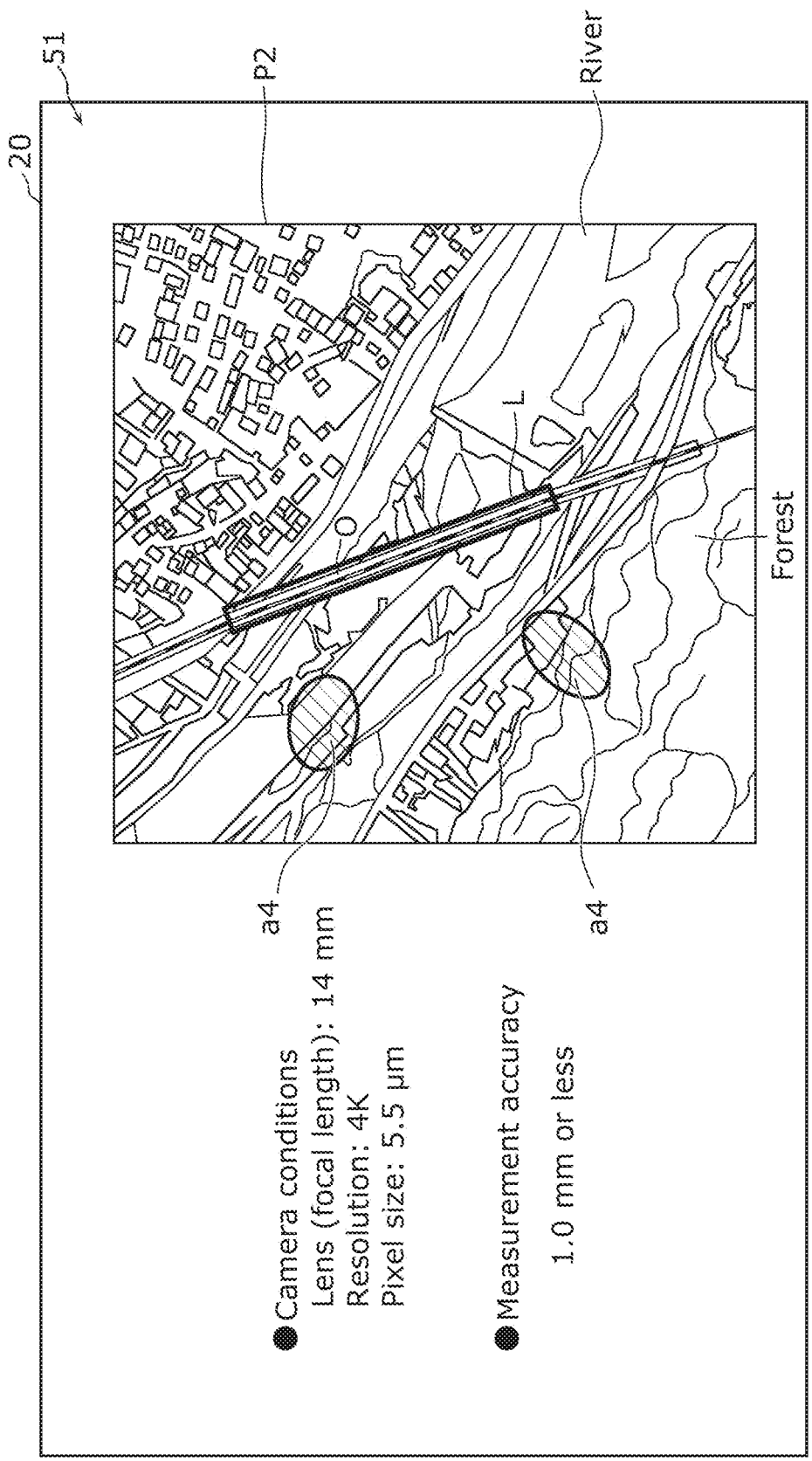
FIG. 7 shows example imaging parameters according to Variation 1 of Embodiment 1.

As shown in FIG. 7, imaging parameters 51 include, for example, "camera conditions", a "measurement accuracy", and image P2. The "camera conditions" are the geometric conditions of first and second imaging devices 30 and 40. The "measurement accuracy" has been obtained in step S21. Image P2 shows candidate imaging area a4.

Image P2 shows candidate imaging area a4 meeting the desired measurement accuracy (e.g., 1.0 mm or less) obtained in step S21.

In this manner, image P2 is displayed to make the range meeting a desired measurement accuracy visible. This allows the operator to easily view a result of calculation by calculation device 10. For example, the operator more easily determines a candidate imaging position of an imaging device for imaging structure O.

Assume that the "desired measurement accuracy" obtained in step S21 includes the measurement error of 1.0 mm or less. In this case, there is no need for calculator 12 to calculate the area with a measurement error larger than 1.0 mm but not larger than 2.0 mm or the area with a measurement error larger than 2.0 mm but not larger than 3.0 mm, for example.

Calculator 12 calculates an area with a measurement error of 1.0 mm or less, an area with a measurement error larger than 1.0 mm but not larger than 2.0 mm, and an area with a measurement error larger than 2.0 mm but not larger than 3.0 mm. Assume that none of the three areas meets the desired measurement accuracy obtained in step S21. In this case, calculator 12 may output an area with the smallest measurement error among the calculated measurement errors and the value of the measurement error in this area. Alternatively, calculator 12 may output the information indicating that there is no area meeting the desired measurement accuracy.

Variation 2 of Embodiment 1

Now, an imaging parameter output method, for example, according to this variation will be described with reference to FIGS. 8 and 9. In the following, the differences from Embodiment 1 will be described mainly. The same reference signs as those in Embodiment 1 are used to represent equivalent elements, and the detailed explanation thereof may be omitted or simplified. An imaging parameter output system according to this variation has the same configuration as imaging parameter output system 1 according to Embodiment 1. The detailed explanation thereof will thus be omitted.

Figure 8:
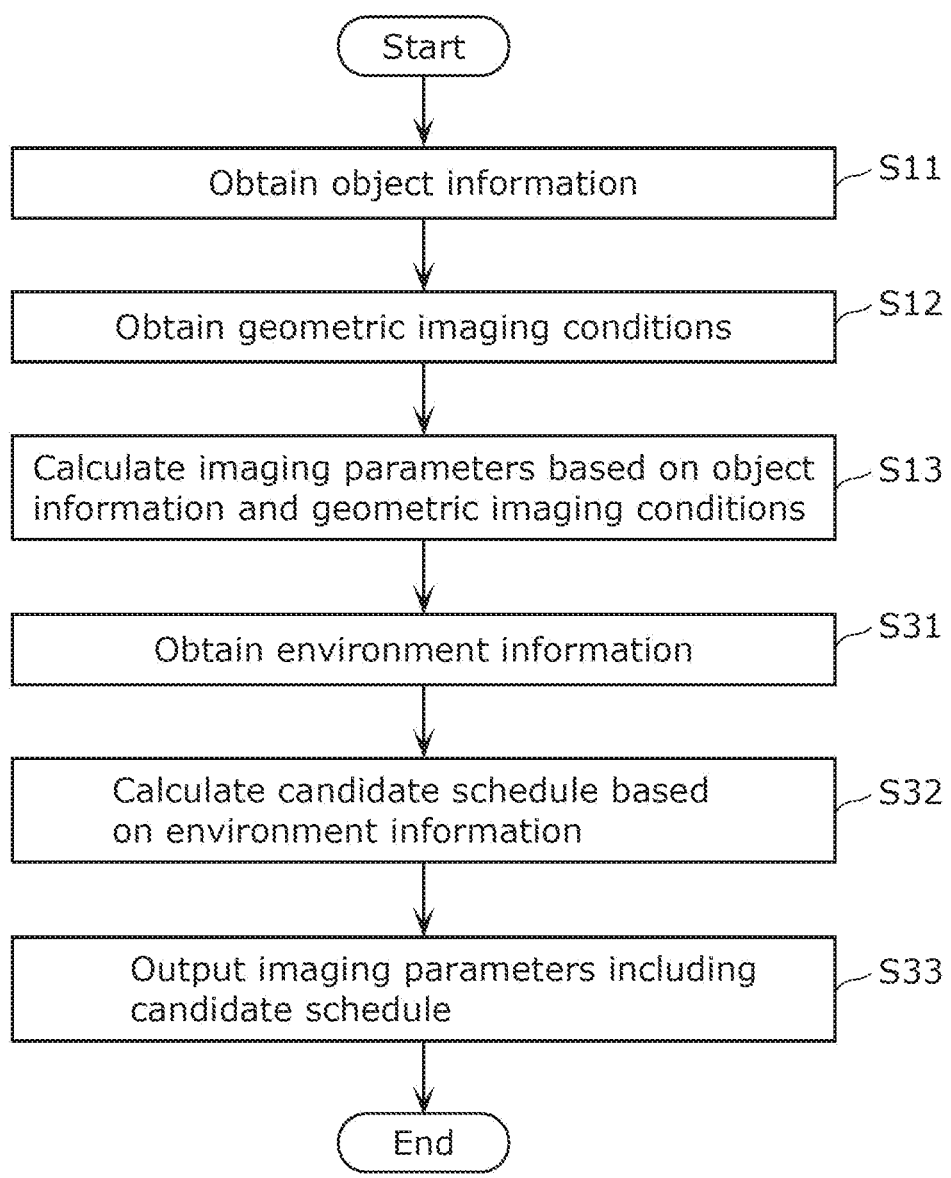
FIG. 8 is a flowchart showing an operation of a calculation device according to Variation 2 of Embodiment 1.

FIG. 8 is a flowchart showing an operation of calculation device 10 according to this variation. Note that steps S11 to S13 are the same as in Embodiment 1 shown in FIG. 3, and the explanation thereof will thus be omitted.

As shown in FIG. 8, in addition to the processing according to Embodiment 1, obtainer 11 of calculation device 10 according to this variation obtains environment information (S31). The environment information indicates the environment around an imaging device placed for imaging structure O, and includes the weather, the sunlight, and the sun orientation, for example. For example, obtainer 11 obtains "fine" as the information indicating the weather. Obtainer 11 then outputs the obtained environment information to calculator 12. Step S31 is an example of "obtaining environment information".

Next, calculator 12 calculates a candidate schedule based on the obtained environment information (S32). Calculator 12 specifies the position of the object based on the object information obtained in step S11. Calculator 12 then obtains the weather information on the region including the specified position. If structure O is imaged in August 2019, calculator 12 obtains the weather information in the region in August 2019. Calculator 12 determines, as candidate dates, dates with a chance of rain lower than or equal to a predetermined percentage based on the weather information. If the environment information indicates "fine" in step S31, the predetermined percentage may be, for example, 50% or 20%. Alternatively, calculator 12 may calculate the times of front lighting and backlighting when imaging structure O within a candidate imaging area based on the candidate imaging area and/or the positions of structure O and the sun. The candidate schedule is included in the imaging parameters.

After that, outputter 13 outputs the imaging parameters (S33). Specifically, outputter 13 outputs the imaging parameters including the candidate schedule.

Now, imaging parameters 52 displayed by display device 20 will be described with reference to FIG. 9. That is, imaging parameters 52 output from calculation device 10 will be described with reference to FIG. 9. FIG. 9 shows example imaging parameters 52 according to this variation. Specifically, the figure shows imaging parameters 52 displayed by display device 20.

Figure 9:
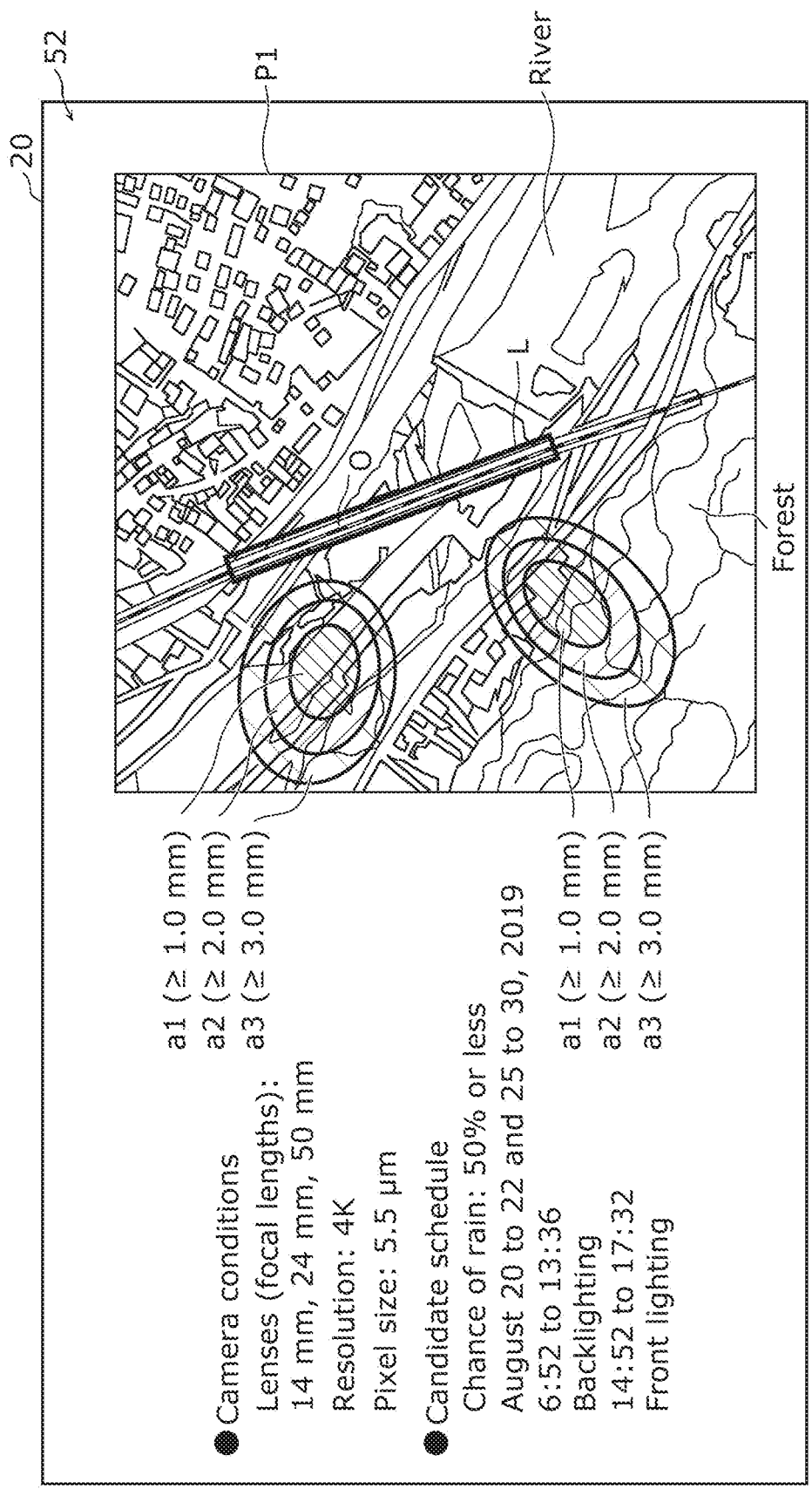
FIG. 9 shows example imaging parameters according to Variation 2 of Embodiment 1.

As shown in FIG. 9, imaging parameters 52 include a "candidate schedule" in addition to imaging parameters 50 according to Embodiment 1. The candidate schedule includes, for example, the dates in August 2019 with a chance of rain of 50% or less and the times of front lighting and backlighting.

Accordingly, the operator easily determines the schedule of imaging using imaging parameters 52.

Embodiment 2

An imaging parameter output method, for example, according to this embodiment allows calculation of imaging parameters in view of geographic information around structure O. Now, the imaging parameter output method, for example, according to this embodiment will be described with reference to FIGS. 10 to 12.

In the following, the differences from Embodiment 1 will be described mainly. The same reference signs as those in Embodiment 1 are used to represent equivalent elements, and the detailed explanation thereof may be omitted or simplified. An imaging parameter output system according to this embodiment has the same configuration as imaging parameter output system 1 according to Embodiment 1. The explanation thereof will thus be omitted.

2-1. Operation of Imaging Parameter Output System

Figure 10:
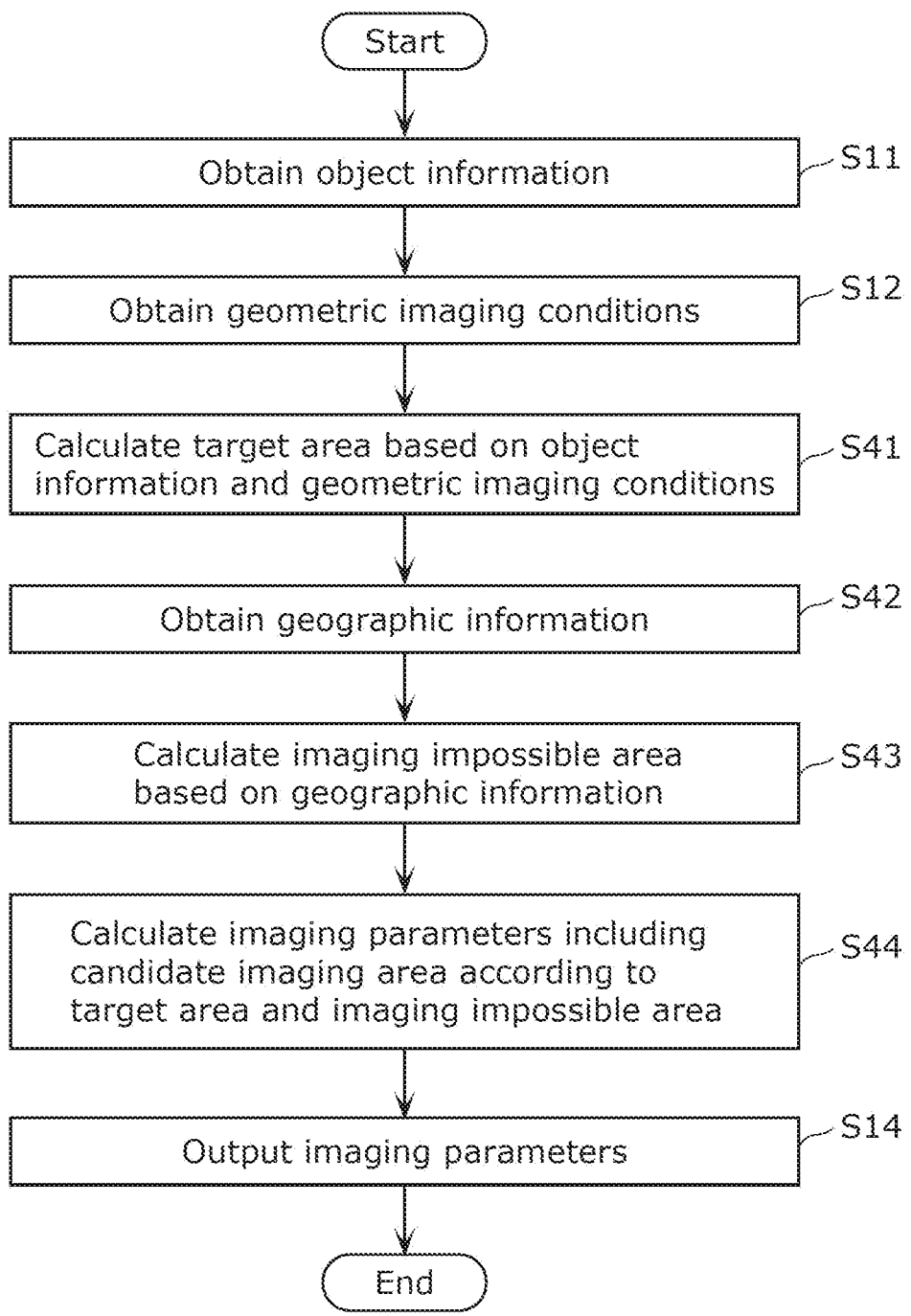
FIG. 10 is a flowchart showing an operation of a calculation device according to Embodiment 2.

FIG. 10 is a flowchart showing an operation of calculation device 10 according to this embodiment. Note that steps S11, S12, and S14 are the same as in Embodiment 1 shown in FIG. 3, and the explanation thereof will thus be omitted.

As shown in FIG. 10, calculator 12 calculates a target area, which may be a candidate imaging area, based on the object information and the geometric imaging conditions (S41). The processing is step S41 is the same as in step S13 in Embodiment 1 shown in FIG. 3. That is, in step S41, for example, the areas in FIG. 5 corresponding to candidate imaging areas a1 to a3 for image P1 are calculated.

Next, in addition to the processing according to Embodiment 1, obtainer 11 obtains geographic information (S42). For example, obtainer 11 may obtain geographic information on an area including structure O specified by the object information obtained in step S11 from an external device via communications. If a storage (not shown) of calculation device 10 stores the geographic information, obtainer 11 may read the geographic information from the storage. For example, obtainer 11 may obtain the geographic information from a geographic information system (GIS). Note that obtainer 11 may obtain geographic information in at least candidate imaging areas a1 to a3 for image P1. Obtainer 11 outputs the geographic information to calculator 12. Step S42 is an example of "obtaining geographic information".

Figure 11:
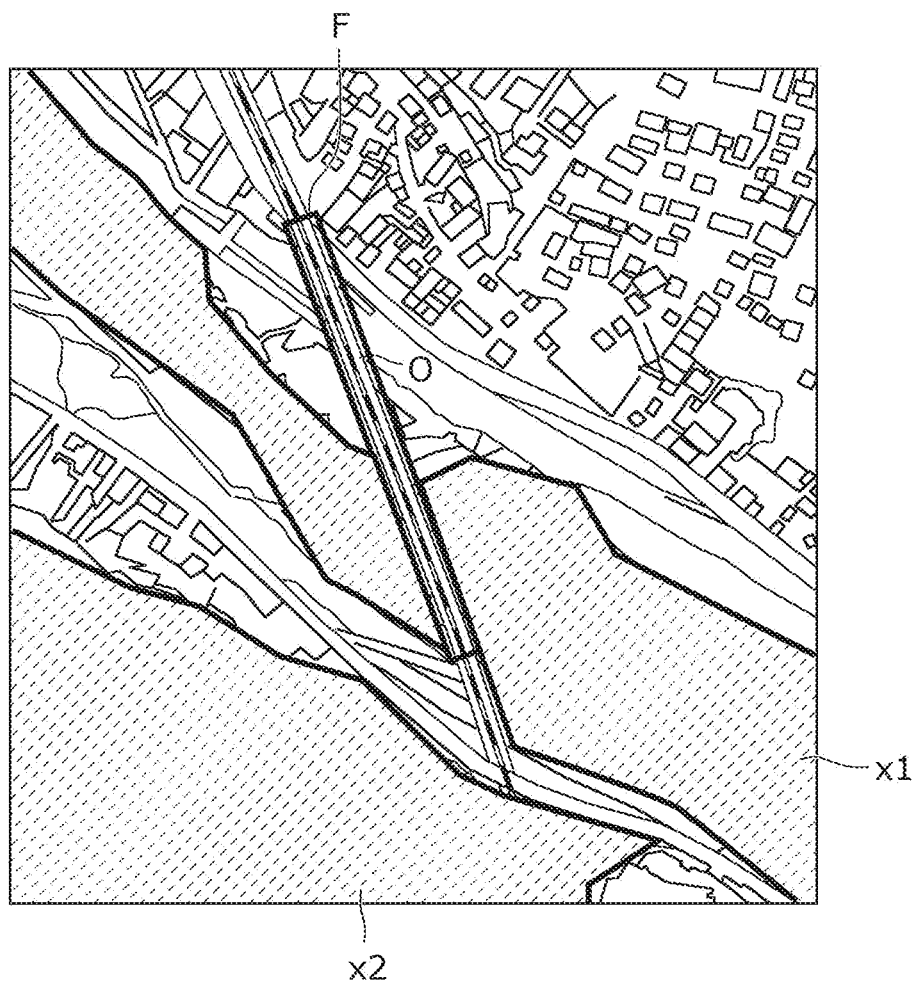
FIG. 11 shows an example imaging impossible area according to Embodiment 2.

Calculator 12 calculates an imaging impossible area based on the geographic information (S43). In the imaging impossible area, an imaging device cannot perform imaging or has difficulty in imaging. The imaging impossible area includes, for example, at least one of the area according to the landform and the area in which the imaging device can be placed limitedly. The "area according to the landform" includes, for example, the area, such as a river, a forest, or a steep slope, in which placing the imaging device is difficult. The "area in which the imaging device can be placed limitedly" includes a private land or a restricted area. FIG. 11 shows example imaging impossible areas x1 and x2 according to this embodiment.

As shown in FIG. 11, there are imaging impossible areas x1 and x2 around structure O. Imaging impossible area x1 corresponds to a river. Imaging impossible area x2 corresponds to a forest. In this manner, calculator 12 specifies imaging impossible areas x1 and x2 based on the geographic information.

Next, referring back to FIG. 10, calculator 12 calculates the imaging parameters including a candidate imaging area according to a target area and an imaging impossible area (S44). Specifically, calculator 12 obtains the candidate imaging area by excluding the imaging impossible area from the target area to calculate the imaging parameters including the candidate imaging area. The candidate imaging area calculated in step S44 corresponds to an area in which imaging is actually possible.

Figure 12:
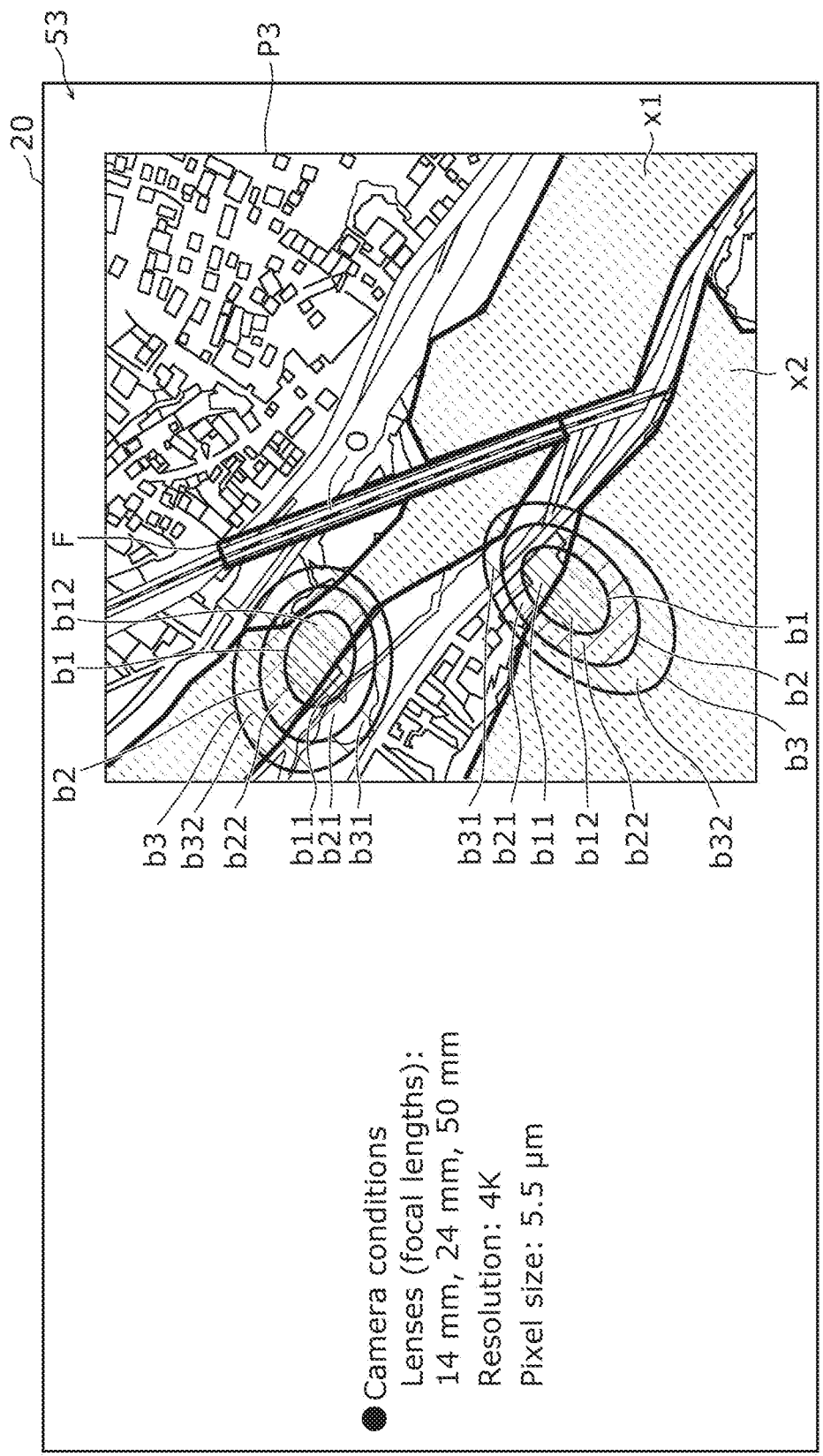
FIG. 12 shows example imaging parameters according to Embodiment 2.

Now, imaging parameters 53 output from calculation device 10 and displayed by display device 20 will be described with reference to FIG. 12. FIG. 12 shows example imaging parameters 53 according to this embodiment. Specifically, the figure shows imaging parameters 53 displayed by display device 20.

As shown in FIG. 12, imaging parameters 53 include, for example, "camera conditions" and image P3. The "camera conditions" are the geometric conditions of first and second imaging devices 30 and 40. Image P3 shows candidate imaging areas each obtained by excluding an imaging impossible area from a target area. Each candidate imaging area b11 is obtained by excluding imaging impossible area b12 from target area b1 (e.g., the area corresponding to candidate imaging area a1 shown in FIG. 5). In addition, each candidate imaging area b11 has a displacement measurement error of 1.0 mm or less, for example. In this manner, each candidate imaging area b11 has a displacement measurement error of 1.0 mm or less, and is an area in which imaging is actually possible. Note that each imaging impossible area b12 is a part of imaging impossible area x1 or x2 overlapping target area b1.

Each candidate imaging area b21 is obtained by excluding imaging impossible area b22 from target area b2 (e.g., the area corresponding to candidate imaging area a2 shown in FIG. 5). In addition, each candidate imaging area b21 has a displacement measurement error larger than 1.0 mm but not larger than 2.0 mm, for example. In this manner, each candidate imaging area b21 has a displacement measurement error larger than 1.0 mm but not larger than 2.0 mm, and is an area in which imaging is actually possible. Note that each imaging impossible area b22 is a part of imaging impossible area x1 or x2 overlapping target area b2.

Each candidate imaging area b31 is obtained by excluding imaging impossible area b32 from target area b3 (e.g., the area corresponding to candidate imaging area a3 shown in FIG. 5). In addition, each candidate imaging area b31 has a displacement measurement error larger than 2.0 mm but not larger than 3.0 mm, for example. In this manner, each candidate imaging area b31 has a displacement measurement error larger than 2.0 mm but not larger than 3.0 mm, and is an area in which imaging is actually possible. Note that each imaging impossible area b32 is a part of imaging impossible area x1 or x2 overlapping target area b3.

In this manner, calculation device 10 displays image P3 to make visible the areas other than imaging impossible areas x1 and x2, that is, the areas in which imaging is actually possible. Accordingly, the operator more properly determines the candidate imaging position of the imaging device for imaging structure O.

While an example has been described above where calculator 12 calculates the imaging parameters based on the geometric imaging conditions and the geographic information, the calculation is however not limited thereto. For example, calculator 12 may calculate the imaging parameters based on only the geographic information, out of the geometric imaging conditions and the geographic information. In this case, obtainer 11 may obtain only the geographic information, out of the geometric imaging conditions and the geographic information. That is, in the flowchart of FIG. 10, the processing in steps S12 and S41 may not be performed. This allows calculator 12 to calculate the imaging parameters including the candidate imaging area based on the geographic information, if the landform around structure O is peculiar and includes a lot of imaging impossible areas. If the processing in steps S12 and S41 is not performed in the flowchart of FIG. 10, step S42 is an example of "obtaining object information and an imaging condition".

The geographic information may include, for example, the information indicating a past measurement accuracy in a candidate imaging area. Since the measurement accuracy in the candidate imaging area is obtainable, calculator 12 calculates the imaging parameters including the candidate imaging area and the accuracy in measuring the displacement in the candidate imaging area.

Embodiment 3

An imaging parameter output method, for example, according to this embodiment allows calculation of imaging parameters in view of the view of structure O from a candidate imaging position of an imaging device. Now, the imaging parameter output method, for example, according to this embodiment will be described with reference to FIGS. 13 to 16. In the following, the differences from Embodiment 1 will be described mainly. The same reference signs as those in Embodiment 1 are used to represent equivalent elements, and the detailed explanation thereof may be omitted or simplified.

3-1. Configuration of Imaging Parameter Output System

Figure 13:
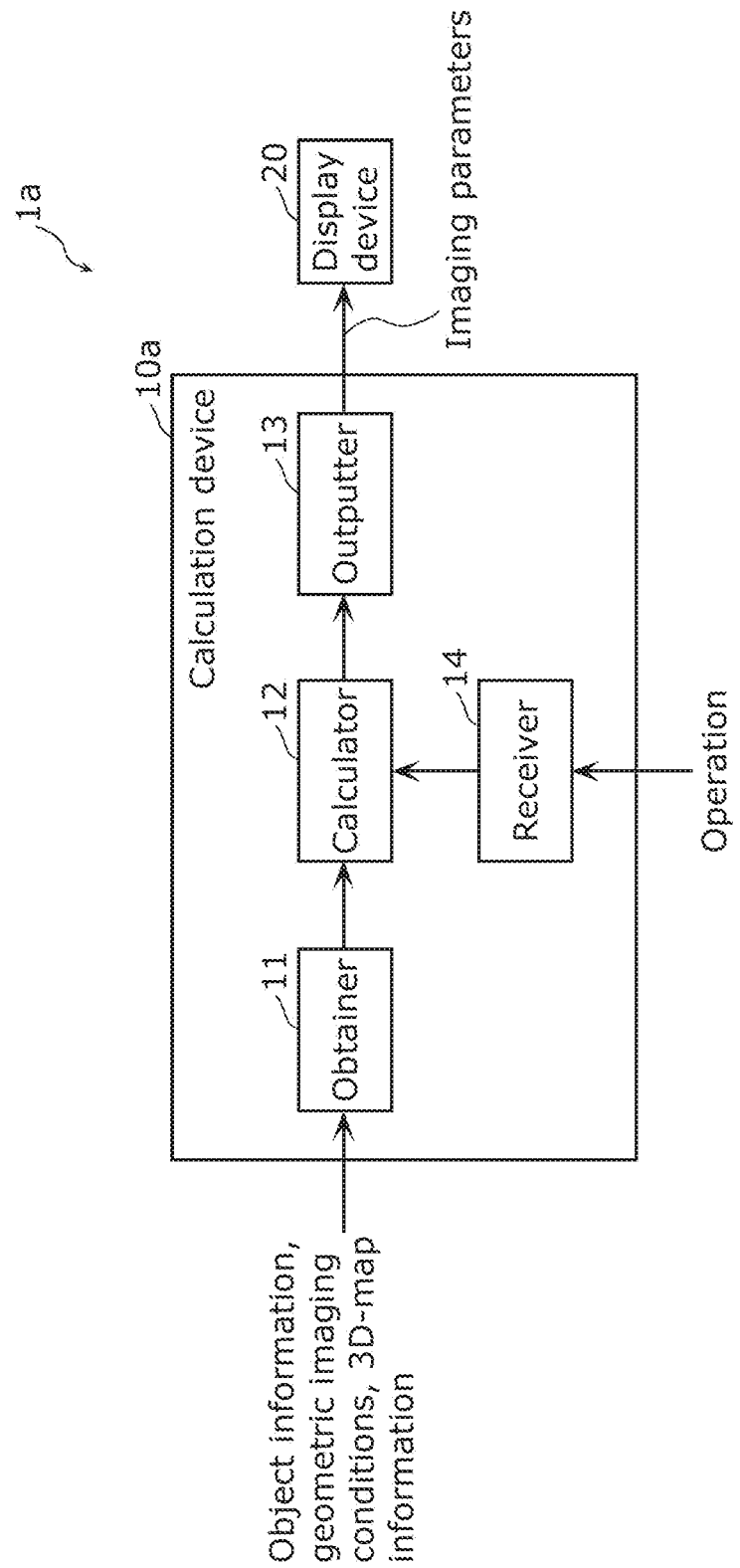
FIG. 13 is a block diagram showing a functional configuration of an imaging parameter output system according to Embodiment 3.

FIG. 13 is a block diagram showing a functional configuration of imaging parameter output system 1a according to Embodiment 3.

As shown in FIG. 13, imaging parameter output system 1a according to this embodiment includes calculation device 10a in place of calculation device 10 of imaging parameter output system 1. Calculation device 10a includes receiver 14 in addition to calculation device 10 of Embodiment 1.

In addition to the object information and the geometric imaging conditions, obtainer 11 obtains three-dimensional map information. The three-dimensional map information indicates structure O and the surroundings of structure O. Note that the three-dimensional map information may be included in the geographic information obtained by obtainer 11.

Receiver 14 is a user interface that receives an operation related to a candidate imaging area from the operator. For example, receiver 14 receives, from the operator, an operation for selecting a candidate imaging position from a candidate imaging area, and an operation for changing the candidate imaging position. Receiver 14 is a hardware key (or a hardware button), a slide switch, or a touch panel, for example.

3-2. Operation of Imaging Parameter Output System

Figure 14:
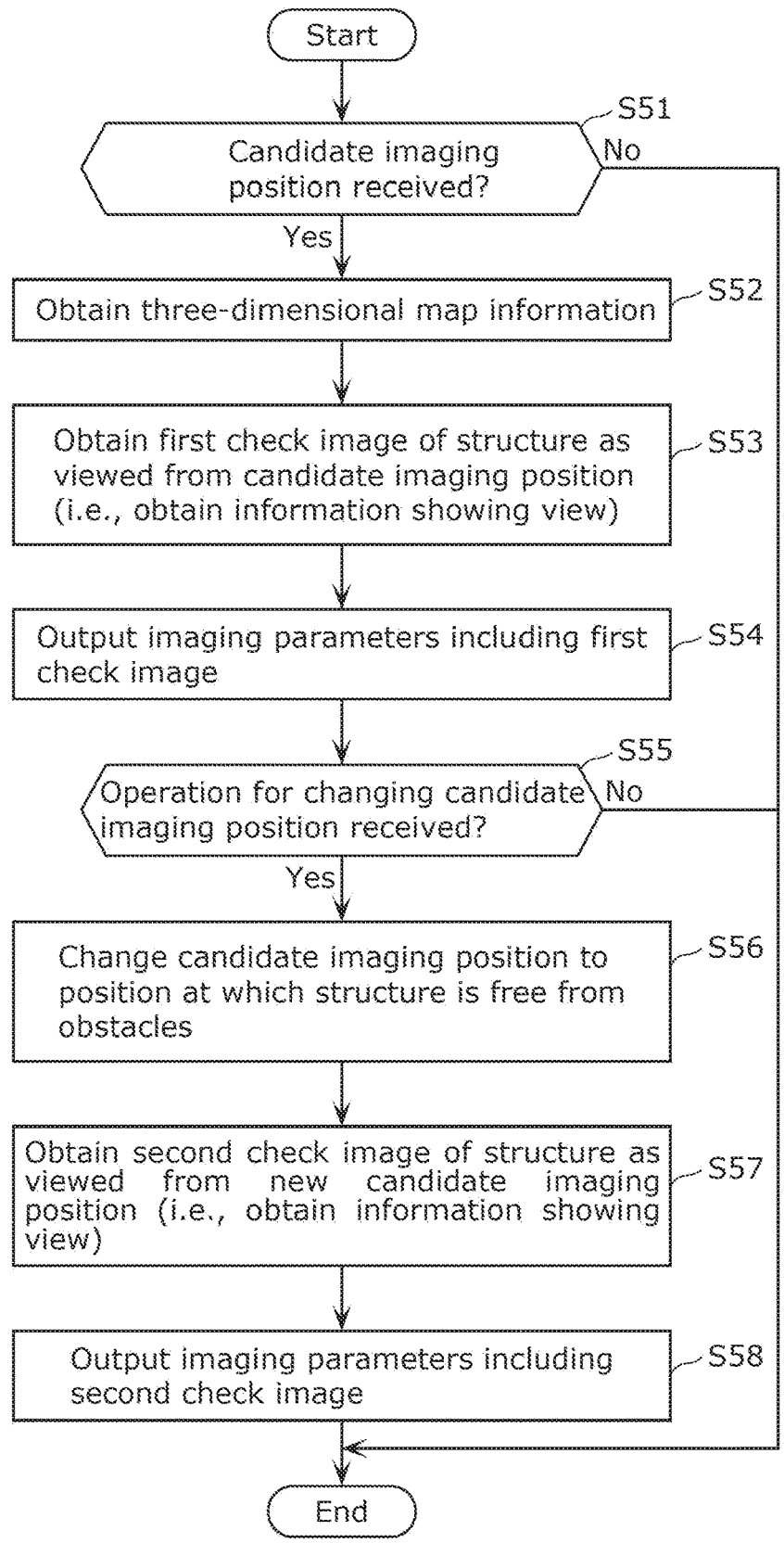
FIG. 14 is a flowchart showing an operation of a calculation device according to Embodiment 3.

Now, an operation of imaging parameter output system 1a will be described with reference to FIGS. 14 to 16. Specifically, an operation of calculation device 10a will be described. FIG. 14 is a flowchart showing the operation of calculation device 10a according to this embodiment. Note that the operation shown in FIG. 14 corresponds to steps S11 to S14 shown in FIG. 3 executed after display device 20 has displayed imaging parameters 50 as shown in FIG. 5.

As shown in FIG. 14, calculator 12 determines whether a candidate imaging position has been received from the operator via receiver 14 (S51). The candidate imaging position is, for example, selected by the operator, as the position for imaging structure O, out of candidate imaging areas a1 to a3 shown in FIG. 5.

Upon receipt of a candidate imaging position from the operator (Yes in S51), calculator 12 obtains three-dimensional map information via obtainer 11 (S52). The three-dimensional map information obtained by obtainer 11 includes, for example, structure O and candidate imaging areas a1 to a3. Obtainer 11 outputs the obtained three-dimensional map information to calculator 12.

Calculator 12 obtains a first check image of structure O as viewed from the candidate imaging position, based on the three-dimensional map information (S53). Calculator 12 then calculates the imaging parameters including the first check image. Outputter 13 outputs the imaging parameters including the first check image to display device 20 (S54). Display device 20 then displays the imaging parameters including the first check image obtained from outputter 13.

Now, imaging parameters 54 displayed by display device 20 will be described with reference to FIG. 15. That is, imaging parameters 54 output from calculation device 10a will be described with reference to FIG. 15. FIG. 15 shows example imaging parameters 54 according to this embodiment. Specifically, the figure shows imaging parameters 54 displayed by display device 20.

Figure 15:
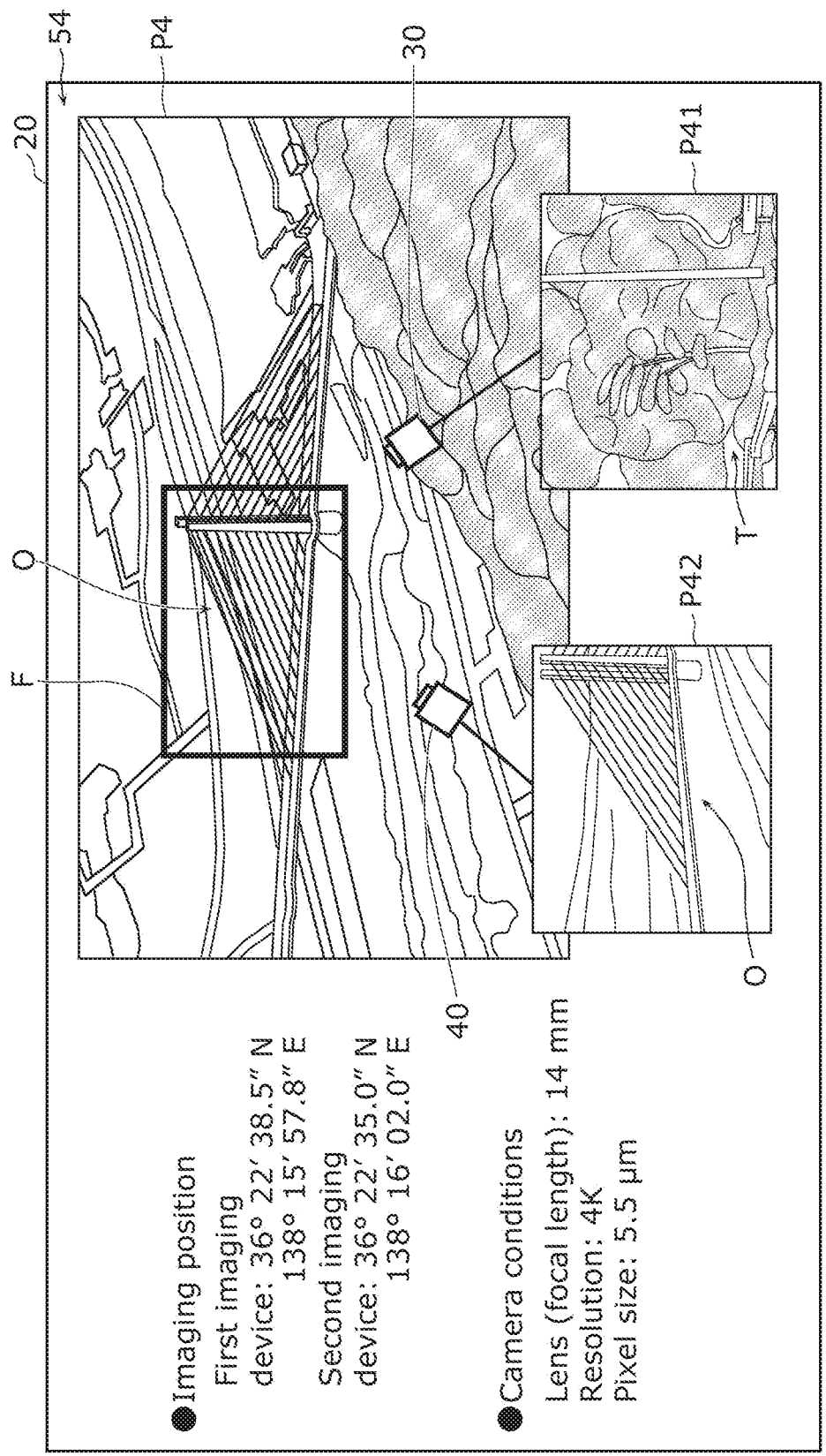
FIG. 15 shows example imaging parameters according to Embodiment 3.

As shown in FIG. 15, imaging parameters 54 include, for example, the imaging positions of first and second imaging devices 30 and 40, "camera conditions", and image P4. The "camera conditions" are the geometric conditions of first and second imaging devices 30 and 40. Image P4 includes first check images P41 and P42.

The imaging positions are the information indicating the candidate imaging positions received in step S51. Each imaging position may include, for example, the latitude and the longitude. Each imaging position may further include the information indicating the height.

First check image P41 is an image of structure O as viewed from a candidate imaging position of first imaging device 30, for example, based on three-dimensional map information. In the example of FIG. 15, first check image P41 includes tree T. That is, there is an obstacle between first imaging device 30 and structure O. In this case, there is a need to change the candidate imaging position of first imaging device 30. By displaying first check image P41, calculation device 10 notifies the operator of the need to change the candidate imaging position of first imaging device 30. In this manner, calculation device 10 displays the first check image to notify the operator of the fact that imaging is actually impossible due to an obstacle, although it seems possible on a two-dimensional map (e.g., a map viewed from above).

First check image P42 is an image of structure O as viewed from a candidate imaging position of second imaging device 40, for example, based on three-dimensional map information. In the example of FIG. 15, first check image P42 includes structure O. That is, there is no obstacle between second imaging device 40 and structure O. In this case, there is no need to change the candidate imaging position. By displaying first check image P42, however calculation device 10 notifies the operator of the fact that there is no need to change the candidate imaging position of second imaging device 40.

Note that first check image P41 and P42 are example information on the views of structure O from the candidate imaging positions. First check image P41 falls within the range corresponding to the angle of view and orientation of first imaging device 30, for example. First check image P42 falls within the range corresponding to the angle of view and orientation of second imaging device 40, for example.

Next, referring back to FIG. 14, calculator 12 determines whether an operation for changing the candidate imaging position has been received via receiver 14 (S55). For example, the operation of changing the candidate imaging position may be performed by touching first check image P41 or by pushing a button for changing the candidate imaging position. Step S55 is an example of "receiving".

Assume that an operation for changing the candidate imaging position has been received (Yes in S55). Calculator 12 then changes the candidate imaging position to a new position, at which structure O is free from obstacles, based on the three-dimensional map information around the candidate imaging position which has been received in step S51 (S56). After that, calculator 12 obtains a second check image of structure O as viewed from the new candidate imaging position (S57). Calculator 12 then calculates the imaging parameters including the second check image. Outputter 13 outputs, to display device 20, the imaging parameters including the second check image (S58). Display device 20 then displays the imaging parameters including the second check image obtained from outputter 13. Step S57 is an example of "updating".

Now, updated imaging parameters 55 displayed by display device 20 will be described with reference to FIG. 16. That is, updated imaging parameters 55 output from calculation device 10a will be described with reference to FIG. 16. FIG. 16 shows example imaging parameters 55 for an updated check image according to this embodiment.

Figure 16:
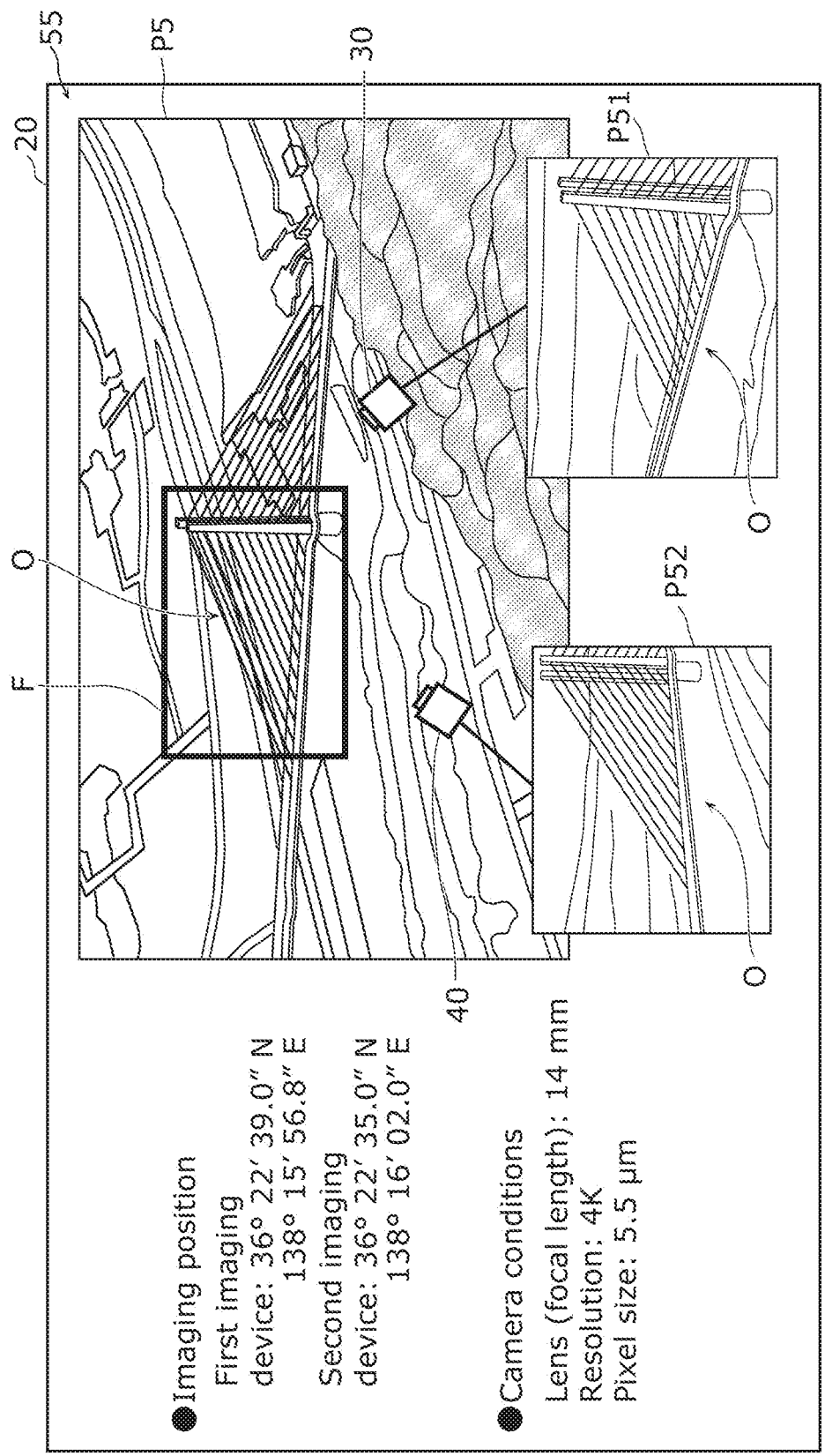
FIG. 16 shows example imaging parameters according to Embodiment 3 after updating a check image.

As shown in FIG. 16, imaging parameters 55 include, for example, the imaging positions of first and second imaging devices 30 and 40, "camera conditions", and image P5. The "camera conditions" are the geometric condition of first and second imaging devices 30 and 40. Image P5 includes second check images P51 and P52.

The imaging positions are the information indicating the new candidate imaging positions obtained in step S57. FIG. 16 shows an example change only in the candidate imaging position of first imaging device 30, out of first and second imaging devices 30 and 40.

Second check image P51 is an image of structure O as viewed from the new candidate imaging position of first imaging device 30, for example, based on the three-dimensional map information. In the example of FIG. 16, second check image P51 includes structure O. That is, there is no obstacle between first imaging device 30 and structure O. Calculation device 10a displays a check image captured by first imaging device 30 at the new candidate imaging position. That is, calculation device 10a updates first check image P41 to second check image P51 to notify the operator of the fact that structure O is imageable from the new candidate imaging position.

Second check image P52 is the same as first check image P42. Note that calculator 12 may change the candidate imaging position of second imaging device 40 in accordance with the change in the candidate imaging position of first imaging device 30. For example, assume that at least one of convergence angle ell or baseline length L between first and second imaging devices 30 and 40 at the new candidate imaging position of first imaging device 30 no more meets the geometric imaging conditions obtained in step S12. In this case, calculator 12 may change the candidate imaging position of second imaging device 40 to meet the geometric imaging condition. Calculator 12 then may calculate the imaging parameters using an image of structure O as viewed from the new candidate imaging position of second imaging device 40, as second check image P52.

Referring back to FIG. 14, if receiver 14 has received neither a candidate imaging position (No in S51) nor an operation for changing the candidate imaging position (No in S55), calculation device 10a ends the processing.

An example has been described above where the processing of displaying the first check image is executed upon receipt of an input related to the candidate imaging position in step S51, the procedure is not limited thereto. For example, calculator 12 may execute the processing of displaying the first check image after receiving the candidate imaging position and then a predetermined operation by the operator. The predetermined operation, may be, for example, clicking "first imaging device 30" on image P4. In this case, first check image P41 associated with only first imaging device 30 out of first and second imaging devices 30 and 40 may be displayed.

Note that an example has been described above where the processing of displaying a check image is executed with an operation of the user handled as a trigger in step S51, the processing is not limited thereto. The processing of displaying a check image may be executed automatically. For example, if the candidate imaging area is an exact position (e.g., a candidate imaging position), an image of structure O as viewed from the exact position may be displayed as a check image. The term "automatically" means that no operation by the operator is required to start the processing of displaying the check image.

Calculator 12 may further calculate the imaging parameters in, as a candidate imaging area, an area providing a measurement accuracy lower than or equal to a predetermined value and including no obstacle according to image analysis of the check image. For example, calculator 12 may obtain three-dimensional map information before step S13 shown in FIG. 3, and calculate the imaging parameters in, as a candidate imaging area, an area without any obstacle in step S13. The "area without any obstacle" may be an area or an exact position.

In the above description, calculator 12 changes the candidate imaging position based on the three-dimensional map information around the candidate imaging position which has been received in step S51, upon receipt of an operation for changing the candidate imaging position in step S55. Alternatively, the process may return to step S51 so that calculator 12 determines whether a new candidate imaging position has been received from the operator via receiver 14 and repeats step S51 to S55.

Variation of Embodiment 3

Now, an imaging parameter output method, for example, according to this variation will be described with reference to FIG. 17. In the following, the differences from Embodiment 3 will be described mainly. The same reference signs as those in Embodiment 3 are used to represent equivalent elements, and the detailed explanation thereof may be omitted or simplified. An imaging parameter output system according to this variation has the same configuration as imaging parameter output system 1a according to Embodiment 3. The explanation thereof will thus be omitted.

Figure 17:
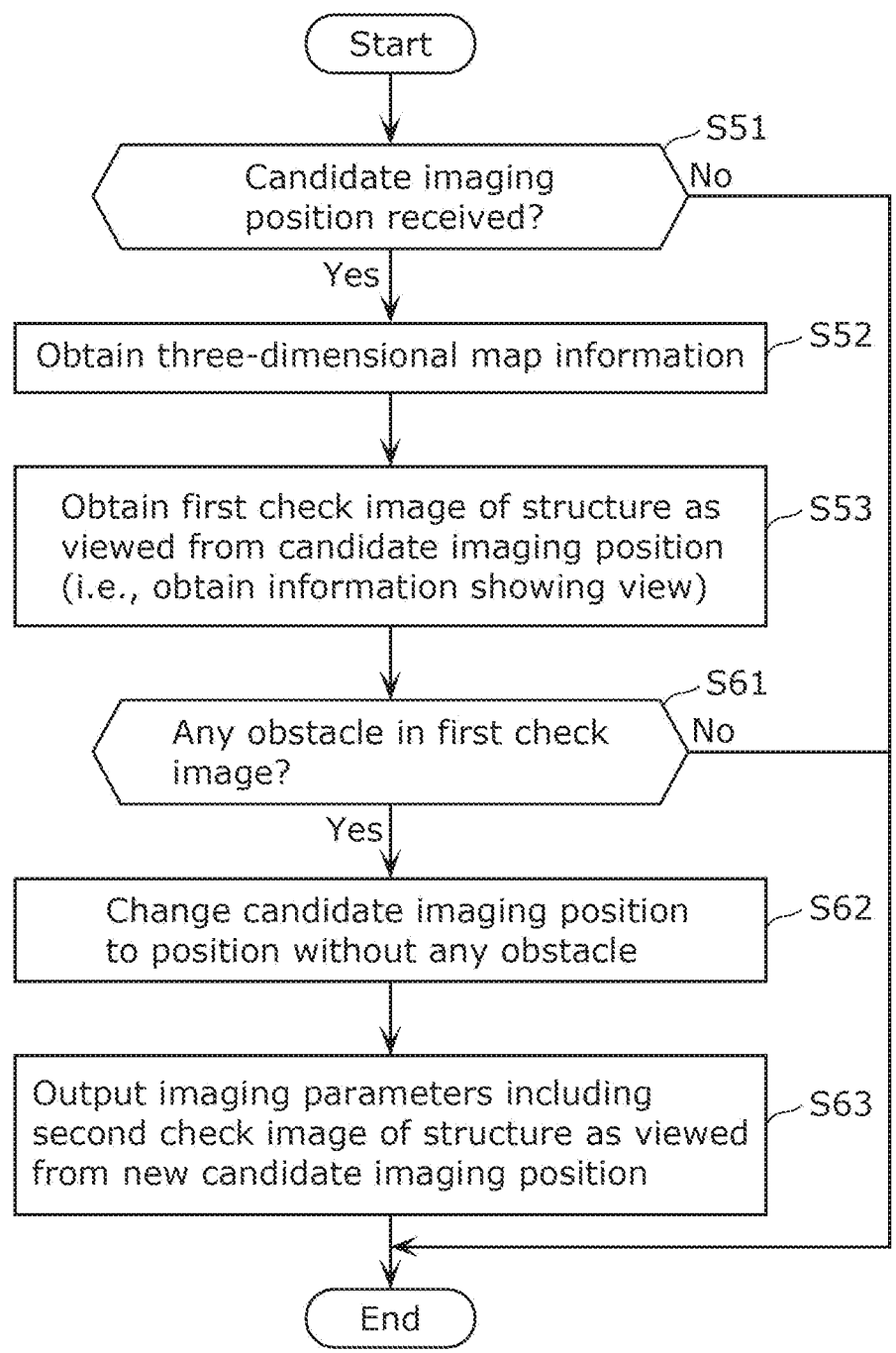
FIG. 17 is a flowchart showing an operation of a calculation device according to a variation of Embodiment 3.

FIG. 17 is a flowchart showing an operation of calculation device 10a according to this variation. Note that step S51 to S53 are the same as in Embodiment 3 shown in FIG. 14 and the description thereof will be omitted.

As shown in FIG. 17, upon obtaining a first check image (e.g., first check image P41 in Embodiment 3) of structure O as viewed from a candidate imaging position (S53), calculator 12 determines whether there is any obstacle in the obtained first check image (S61). For example, calculator 12 may make the determination described above depending on the presence or absence of the predetermined object in the first check image. With respect to the predetermined object, the determination on the presence or absence is difficult on a two-dimensional map. The predetermined object includes, for example, a static object such as a forest, a building, or a roadside structure. The roadside structure includes poles, street lights, traffic mirrors, and traffic and advertising signs, for example.

Note that the detection method how calculator 12 determines whether the first check image includes any predetermined object is not particularly limited, but may be pattern matching, for example.

Upon determination that there is an obstacle in the first check image (Yes in S61), calculator 12 changes the candidate imaging position to a position without any obstacle (S62). Calculator 12 changes the candidate imaging position to a new position meeting the geometric imaging conditions, and obtains a second check image in the new candidate imaging position. If the obtained second check image includes no obstacle, the new candidate imaging position is handled as a position without any obstacle. Calculator 12 then generates the imaging parameters including the second check image.

Next, outputter 13 outputs, to display device 20, the imaging parameters including a second check image of structure O as viewed from the new candidate imaging position (S63).

In step S62, calculator 12 may change no candidate imaging position but the orientation of an imaging device to the direction without any obstacle. Changing the orientation of an imaging device is included in "changing the position without any obstacle". The image of structure O as viewed in the new direction is an example of the "second check image".

Upon determining that there is no obstacle in the first check image (No in S61), calculator 12 ends the processing.

An example has been described above where calculator 12 proceeds to step S62, if there is an obstacle in the first check image (Yes in S61). The process is not limited thereto. Information indicating that there is an obstacle in the first check image may be output to display device 20 via outputter 13. In this case, the candidate imaging position may be changed manually by an operation by the operator at receiver 14.

Other Embodiments

The imaging parameter output method, for example, according to one or more aspects of the present disclosure has been described above in the embodiments and variation (hereinafter simply referred to as the "embodiments"). The present disclosure is however not limited thereto. The one or more aspects of the present disclosure may include other embodiments, such as those obtained by variously modifying the embodiments as conceived by those skilled in the art or those achieved by freely combining the constituent elements in different embodiments without departing from the scope and spirit of the present disclosure.

For example, an example has been described above in the embodiments where the calculation device outputs the imaging parameters of an imaging device that captures an image for measuring the displacement representing the movement of a structure. Alternatively, the calculation device may output the imaging parameters of an imaging device that simply captures an image of an object. That is, the image is not limited to the image for measuring the displacement. For example, the image may be a landscape image. In this case, the accuracy in measuring the displacement is not included in the imaging parameters.

In this case, the imaging parameter output method is the method of outputting an imaging parameter of an imaging device that captures an image of an object. The imaging parameter output method includes: obtaining object information identifying the object, and a geometric imaging condition for imaging the object; calculating an imaging parameter including a candidate imaging area for placing the imaging device, based on the object information and the geometric imaging condition; and outputting the imaging parameter calculated. This method reduces the time for the imaging work at an imaging site.

An example has been described in the embodiments, for example, where the calculation device outputs the imaging parameters of an imaging device that captures an image for measuring the displacement representing the movement of the structure. The captured image is not limited to the image for measuring the displacement. The calculation device may output an imaging parameter of an imaging device that captures an image for measuring the physical quantity of the object. Here, the physical quantity may be the length or angle of the whole object or a specific part of the object. In this manner, the physical quantity may be obtained from a single image. If the whole object moves, the physical quantity may be the speed, acceleration, or other characteristics of the object. Note that the displacement described above is included in the physical quantity.

In this case, the imaging parameter output method is the method of an imaging parameter of an imaging device that captures an image for measuring a physical quantity of an object. The imaging parameter output method includes: obtaining object information identifying the object, and a geometric imaging condition for imaging the object; calculating the imaging parameter including a candidate imaging area for placing the imaging device and accuracy in measuring the physical quantity of the object in the candidate imaging area, based on the object information and the geometric imaging condition; and outputting the imaging parameter calculated.

An example has been described above in the embodiments, for example, where the imaging impossible area is obtained from the geographic information but not limited thereto. For example, the calculation device may obtain the imaging impossible area from the operator.

In the embodiments described above, the geographic information may include dynamic information such as event information on a festival, or construction information on a road.

In the embodiments, for example, described above, at least one of the obtainer and the receiver may obtain the information based on the voice of the operator. In this case, the calculation device may include, for example, a microphone that obtains voice, or a communication circuit communicatively connected to a server (e.g., a cloud server) that performs voice recognition processing.

Where an example has been described above in the embodiments, for example, where the imaging device is fixed to the ground, the configuration is not limited thereto. The imaging device may be placed on a flying body such as a drone. That is, the imaging parameters may be used for imaging a structure using the flying body such as a drone.

An example has been described above in the embodiments, for example, where the obtainer is a communicator but not limited thereto. For example, the obtainer may be a connector connected to a recording medium. For example, the connector may be a universal serial bus (USB) terminal connected to a USB, a SD card slot for inserting an SD card, or an optical drive for inserting an optical disk.

The order of executing the steps in each flowchart is for illustrating the present disclosure in detail. The steps may be executed in an order other than what has been described above. Some of the steps described above may be executed at the same time as (in parallel with) another step.

In the block diagrams, the functional blocks are divided as an example. A plurality of functional blocks may serve as a single functional block. A single functional block may be divided into a plurality of functional blocks. Some functional blocks may shift to another functional block. Alternatively, similar functions of a plurality of functional blocks may be processed by single hardware or software in parallel or in a time division manner.

An example has been described above in the embodiments, for example, where the calculation device includes no display device, that is, the calculation device and the display device are separated. Alternatively, the calculation device may include a display device. In this case, the display device functions as a display, which is a part of a calculation device. In this manner, the imaging parameter output system may be a single device.

While an example has been described in the embodiments described above where the first and second imaging devices are separated, the configuration not limited thereto. The first and second imaging devices may serve as a single imaging device. The first and second imaging devices may be what are called "stereo cameras". In this case, the baseline length included in the geometric imaging conditions may be the distance between two lenses. The distance between two lens is indicated by a fixed value.

While an example has been described above in the embodiments where the first and second imaging devices have the same configuration, the configurations are not limited thereto. The first and second imaging devices may have different configurations. For example, the first and second imaging devices may have different sensor specifications. In this case, in step S12, each imaging device may obtain sensor specifications. For example, in step S12, the obtainer may obtain the geometric imaging conditions including the fact that the first and second imaging devices have different sensor specifications.

In the embodiments, for example, described above, how the devices of the imaging parameter output system communicate with each other is not particularly limited. Wired or wireless communications may be established between the devices. A combination of the wired and wireless communications may be established between the devices.

In the embodiments, for example, described above, some or all of the constituent elements of the calculation device may be a single system large-scale integrated (LSI) circuit.

Each system LSI circuit is a super multifunctional LSI circuit produced by integrating a plurality of processors on a single chip. Specifically, the system LSI circuit is a computer system including a microprocessor, a read-only memory (ROM), and a random-access memory (RAM), for example. The ROM stores computer programs. The microprocessor operates in accordance with the computer programs so that the system LSI circuit fulfills its functions.

While the system LSI circuits are named here, the integrated circuits may be referred to as ICs, LSI circuits, super LSI circuits, or ultra-LSI circuits depending on the degree of integration. The circuit integration is not limited to the LSI. The devices may be dedicated circuits or general-purpose processors. A field programmable gate array (FPGA) programmable after the manufacture of an LSI circuit, or a reconfigurable processor capable of reconfiguring the connections and settings of circuit cells inside an LSI may be employed.

Appearing as an alternative circuit integration technology to the LSI, another technology that progresses or deprives from the semiconductor technology may be used for integration of functional blocks. Application of biotechnology is possible.

A part or all of the various processing described above may be implemented by hardware such as an electronic circuit or software. Note that the processing by software is achieved by a processor included in the calculation device executing the programs stored in the memory.

An aspect of the present disclosure may be directed to a computer program causing a computer to execute characteristic steps included in the imaging parameter output method. Another aspect of the present disclosure may be directed to a non-transitory computer-readable recording medium recording such a program. For example, such a program may be recorded in a recording medium and distributed. For example, the distributed program may be installed in a device including another processor and executed by the processor so that the device performs the processing described above.

INDUSTRIAL APPLICABILITY

The present disclosure is widely applicable to a device that determines the imaging parameters of a measurement system for measuring the displacement of a structure.

The invention claimed is:

1. An imaging parameter output method of outputting an imaging parameter of an imaging device that captures an image for measuring a displacement representing a movement of an object, the imaging parameter output method comprising:
   obtaining object information identifying the object, and a geometric imaging condition for imaging the object;
   calculating the imaging parameter including a candidate imaging area for placing the imaging device and a measurement accuracy in measuring the displacement in the candidate imaging area, based on the object information and the geometric imaging condition, without imaging the object using the imaging device; and
   outputting the imaging parameter to a presentation device.

2. The imaging parameter output method according to claim 1, further comprising:
   obtaining geographic information on an area including the object, wherein
   the calculating includes calculating the imaging parameter further based on the geographic information.

3. The imaging parameter output method according to claim 2, wherein
the calculating includes calculating the imaging parameter including the candidate imaging area obtained by excluding, from a target area for placing the imaging device, an imaging impossible area in which the imaging device cannot perform imaging, the target area being calculated based on the object information and the geometric imaging condition, the imaging impossible area being obtained based on the geographic information.

4. The imaging parameter output method according to claim 2, wherein
the candidate imaging area includes a candidate imaging position, and
the imaging parameter further includes a first check image for checking a view of the object from the candidate imaging position.

5. The imaging parameter output method according to claim 4, further comprising:
receiving an operation for changing the candidate imaging position to a new candidate imaging position; and
updating the first check image included in the imaging parameter to a second check image of the object as viewed from the new candidate imaging position.

6. The imaging parameter output method according to claim 1, further comprising:
obtaining a desired measurement accuracy in measuring the displacement in the candidate imaging area, wherein
the candidate imaging area meets the desired measurement accuracy.

7. The imaging parameter output method according to claim 1, further comprising:
obtaining environment information indicating environment at a time of imaging the object, wherein
the imaging parameter includes information on a candidate schedule for imaging the object according to the environment information.

8. The imaging parameter output method according to claim 1, wherein
the geometric imaging condition includes at least one of a range of imaging the object, lens information on a lens applicable to the imaging device, or information on a sensor of the imaging device.

9. The imaging parameter output method according to claim 1, wherein
the imaging device includes a first imaging device and a second imaging device that image the object from points of view different from each other, and
the geometric imaging condition further includes at least one of a baseline length between the first imaging device and the second imaging device or a convergence angle formed by the first imaging device and the second imaging device.

10. An imaging parameter output method of outputting an imaging parameter of an imaging device that captures an image for measuring a displacement representing a movement of an object, the imaging parameter output method comprising:
obtaining object information identifying the object, and geographic information on an area including the object;
calculating the imaging parameter including a candidate imaging area for placing the imaging device and a measurement accuracy in measuring the displacement in the candidate imaging area, based on the object information and the geographic information, without imaging the object using the imaging device; and
outputting the imaging parameter to a presentation device.

11. An imaging parameter output method of outputting an imaging parameter of an imaging device that captures an image for measuring a physical quantity of an object, the imaging parameter output method comprising:
obtaining object information identifying the object, and a geometric imaging condition for imaging the object;
calculating the imaging parameter including a candidate imaging area for placing the imaging device and a measurement accuracy in measuring the physical quantity of the object in the candidate imaging area, based on the object information and the geometric imaging condition, without imaging the object using the imaging device; and
outputting the imaging parameter to a presentation device.

12. An imaging parameter output device for outputting an imaging parameter of an imaging device that captures an image for measuring a displacement representing a movement of an object or a physical quantity of the object, the imaging parameter output device comprising:
a processor; and
memory,
wherein the processor:
obtains object information identifying the object, and a geometric imaging condition for imaging the object;
calculates the imaging parameter including a candidate imaging area for placing the imaging device and a measurement accuracy in measuring the displacement in the candidate imaging area or a measurement accuracy in measuring the physical quantity of the object in the candidate imaging area, based on the object information and the geometric imaging condition, without imaging the object using the imaging device; and
outputs the imaging parameter to a presentation device.

13. An imaging parameter output device for outputting an imaging parameter of an imaging device that captures an image for measuring a displacement representing a movement of an object or a physical quantity of the object, the imaging parameter output device comprising:
a processor; and
memory,
wherein the processor:
obtains object information identifying the object, and geographic information on an area including the object;
calculates the imaging parameter including a candidate imaging area for placing the imaging device and a measurement accuracy in measuring the displacement in the candidate imaging area or a measurement accuracy in measuring the physical quantity of the object in the candidate imaging area, based on the object information and the geographic information, without imaging the object using the imaging device; and
outputs the imaging parameter to a presentation device.

14. The imaging parameter output method according to claim 1, wherein
the imaging parameter relates to a stereo camera including a first imaging device and a second imaging device that capture images for measuring the displacement from points of view different from each other,
the obtaining of the object information and the geometric imaging condition includes obtaining the object information indicating a position of the object and a size of a measuring range, and the geometric imaging condition including at least one of a convergence angle or a maximum baseline length between the first imaging device and the second imaging device, and the calculating further includes calculating, based on the object information, the imaging parameter including candidate imaging areas for placing the first imaging device and the second imaging device to measure displacement at an accuracy within a predetermined range and, the accuracy in measuring the displacement in the candidate imaging area.

* * * * *